(12) United States Patent
Lai et al.

(10) Patent No.: US 9,066,623 B2
(45) Date of Patent: *Jun. 30, 2015

(54) BREWED BEVERAGE APPLIANCE AND METHOD

(75) Inventors: Kin Man Lai, Shatin (HK); Kam Fai Fung, Tuen Mun (HK); Barbara Lynn Schnabel, Chappaqua, NY (US)

(73) Assignee: Conair Corporation, Stamford, CT (US)

( * ) Notice: Subject to any disclaimer, the term of this patent is extended or adjusted under 35 U.S.C. 154(b) by 74 days.

This patent is subject to a terminal disclaimer.

(21) Appl. No.: 13/230,980

(22) Filed: Sep. 13, 2011

(65) Prior Publication Data

US 2012/0121768 A1    May 17, 2012

Related U.S. Application Data

(60) Provisional application No. 61/413,744, filed on Nov. 15, 2010.

(51) Int. Cl.
*A47J 31/40* (2006.01)
*A47J 31/42* (2006.01)
*A47J 31/36* (2006.01)
*A47J 31/46* (2006.01)
*A47J 31/06* (2006.01)

(52) U.S. Cl.
CPC .............. *A47J 31/42* (2013.01); *A47J 31/3623* (2013.01); *A47J 31/46* (2013.01); *A47J 31/0689* (2013.01)

(58) Field of Classification Search
USPC ........ 99/286, 287, 295, 306, 307, 290, 302 R
See application file for complete search history.

(56) References Cited

U.S. PATENT DOCUMENTS

| 2,968,560 | A |   | 1/1961  | Goros |
|-----------|---|---|---------|-------|
| 3,596,588 | A | * | 8/1971  | Moss ............................. 99/282 |
| 4,196,658 | A | * | 4/1980  | Takagi et al. ................... 99/286 |
| 4,389,925 | A |   | 6/1983  | Piana |
| 4,882,982 | A | * | 11/1989 | Muttoni ......................... 99/295 |
| 4,901,630 | A |   | 2/1990  | Hall |

(Continued)

FOREIGN PATENT DOCUMENTS

WO    2007016977 A1    2/2007
WO    2007138016 A1    12/2007

OTHER PUBLICATIONS

International Search Report dated Nov. 12, 2012 from corresponding PCT Application No. PCT/US2012/044281.

*Primary Examiner* — Reginald L Alexander
(74) *Attorney, Agent, or Firm* — McCormick, Paulding & Huber LLP

(57) ABSTRACT

A beverage making appliance uses a specialized beverage container and a related method of brewing a beverage. The container includes a cup-shaped body having a floor, a circumferential wall, and a top opening, a filter element positioned above the floor, at least one aperture formed in the floor, and a cover releasably attached to the cup body and covering the top opening. The appliance includes a base adapted to receive a beverage receptacle, a reservoir, a housing, a brewing tray in mechanical communication with the housing and dimensioned to receive a container containing at least one drink ingredient having particles of a first size, a grinding mechanism and a water delivery mechanism to selectively deliver water from the reservoir to one of a brewed beverage outlet in fluid communication with the receptacle, and a hot-water outlet.

15 Claims, 44 Drawing Sheets

(56) References Cited

U.S. PATENT DOCUMENTS

| | | | |
|---|---|---|---|
| 4,962,693 A * | 10/1990 | Miwa et al. ............... 99/283 |
| 5,267,506 A | 12/1993 | Cai |
| 5,292,437 A | 3/1994 | Ford |
| 5,531,152 A | 7/1996 | Gardosi |
| 5,615,601 A | 4/1997 | Eugstar |
| 5,794,519 A | 8/1998 | Fischer |
| 5,865,095 A | 2/1999 | Mulle |
| 5,875,703 A | 3/1999 | Rolfes |
| 5,992,299 A * | 11/1999 | Fong ....................... 99/286 |
| 6,606,938 B2 | 8/2003 | Taylor |
| 6,658,989 B2 | 12/2003 | Sweeney et al. |
| 6,955,116 B2 * | 10/2005 | Hale ....................... 99/295 |
| 7,017,472 B2 | 3/2006 | Grant et al. |
| 7,089,849 B2 | 8/2006 | Chen et al. |
| 7,210,401 B1 | 5/2007 | Rolfes et |
| 7,469,627 B2 * | 12/2008 | Li ........................... 99/286 |
| 7,578,230 B2 | 8/2009 | Rahn |
| 7,735,414 B2 * | 6/2010 | Medema ................. 99/302 R |
| 2002/0144604 A1 * | 10/2002 | Winkler et al. ......... 99/302 R |
| 2002/0148356 A1 * | 10/2002 | Lazaris et al. ............. 99/295 |
| 2003/0005826 A1 | 1/2003 | Sargent et al. |
| 2005/0034605 A1 | 2/2005 | Webster et al. |
| 2006/0090653 A1 | 5/2006 | McDuffie et al. |
| 2009/0205505 A1 | 8/2009 | Russo |
| 2010/0018404 A1 * | 1/2010 | Villa et al. ................. 99/288 |
| 2010/0258010 A1 * | 10/2010 | Castellani .................. 99/295 |
| 2010/0303964 A1 | 12/2010 | Beaulieu et al. |
| 2011/0076360 A1 | 3/2011 | Schnabel |

* cited by examiner

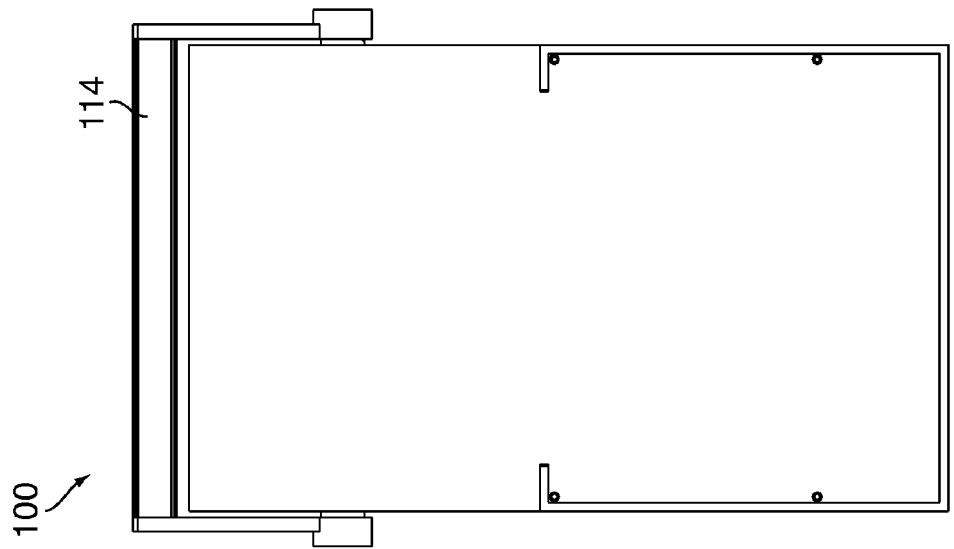
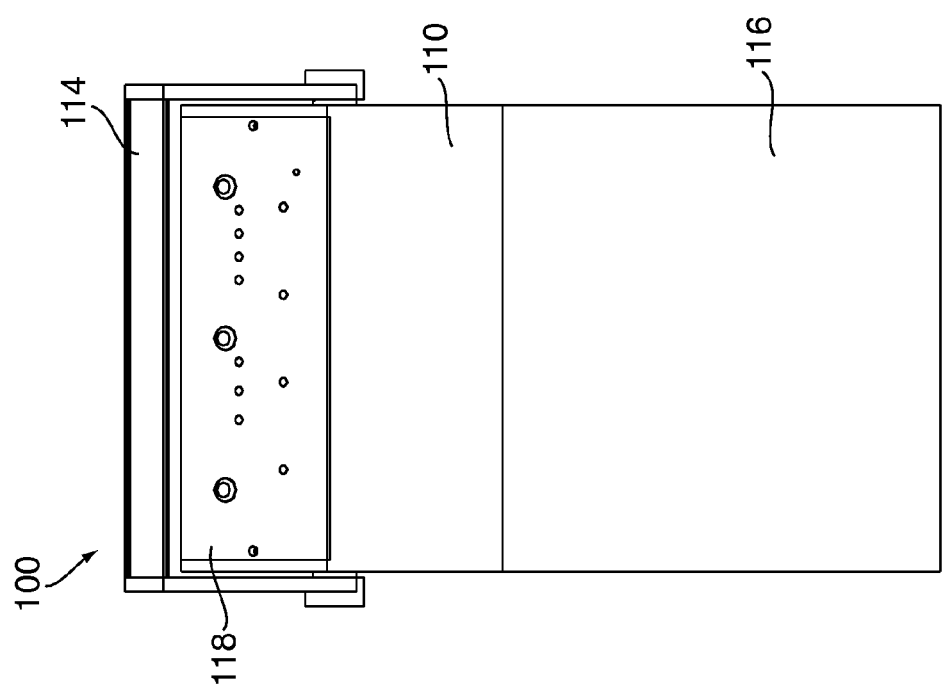

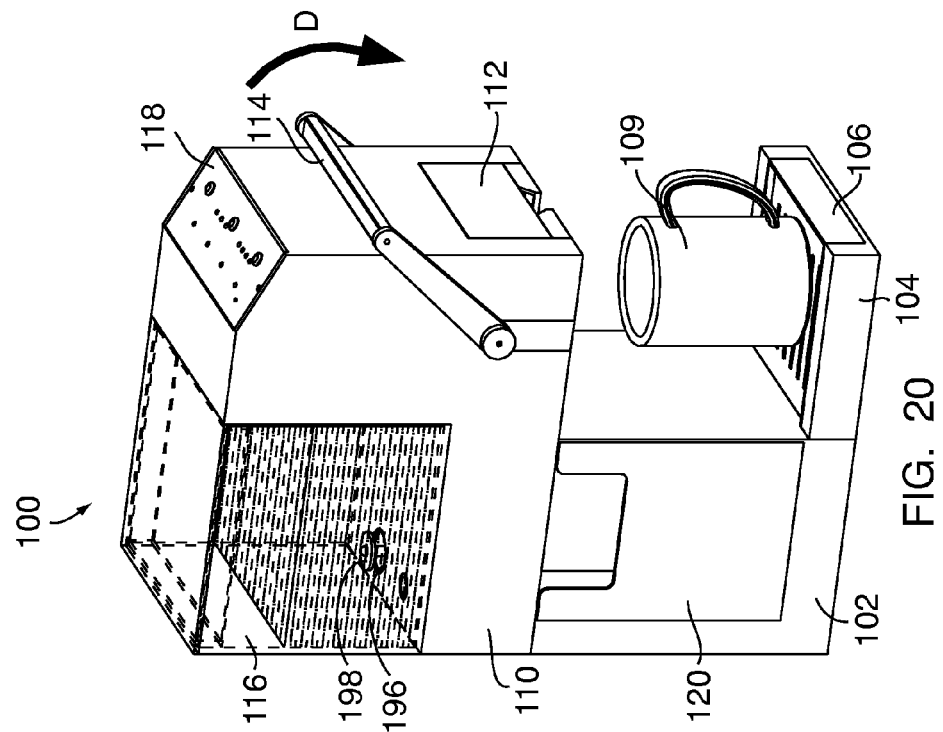
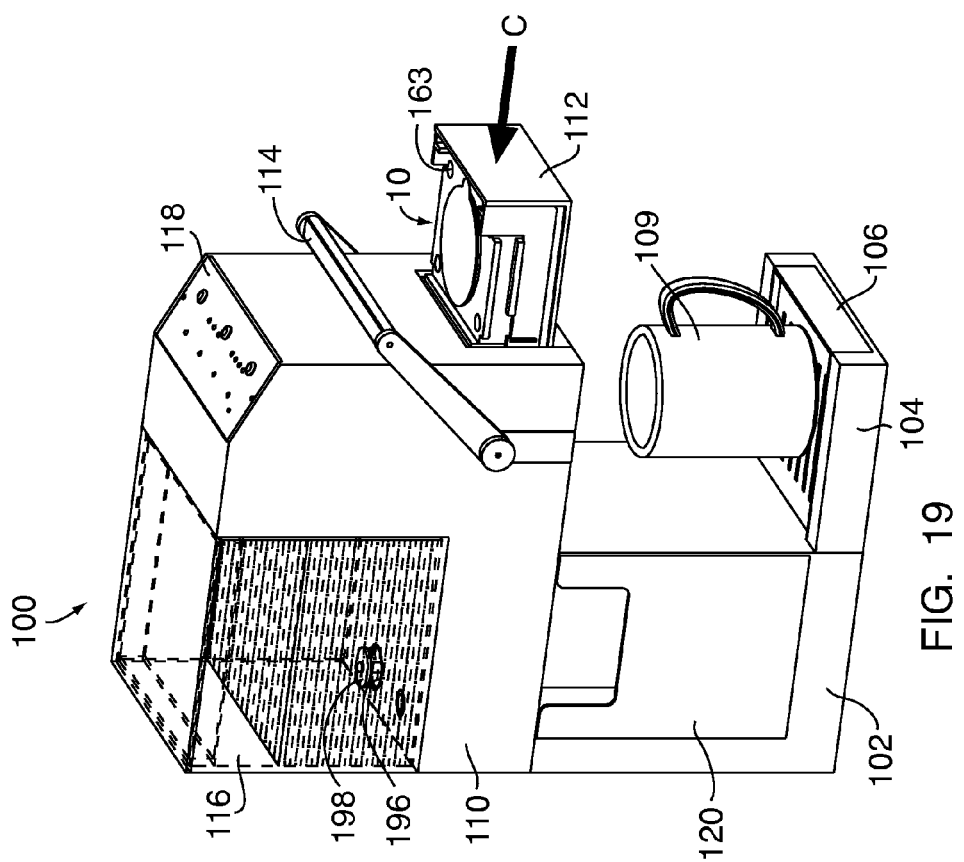

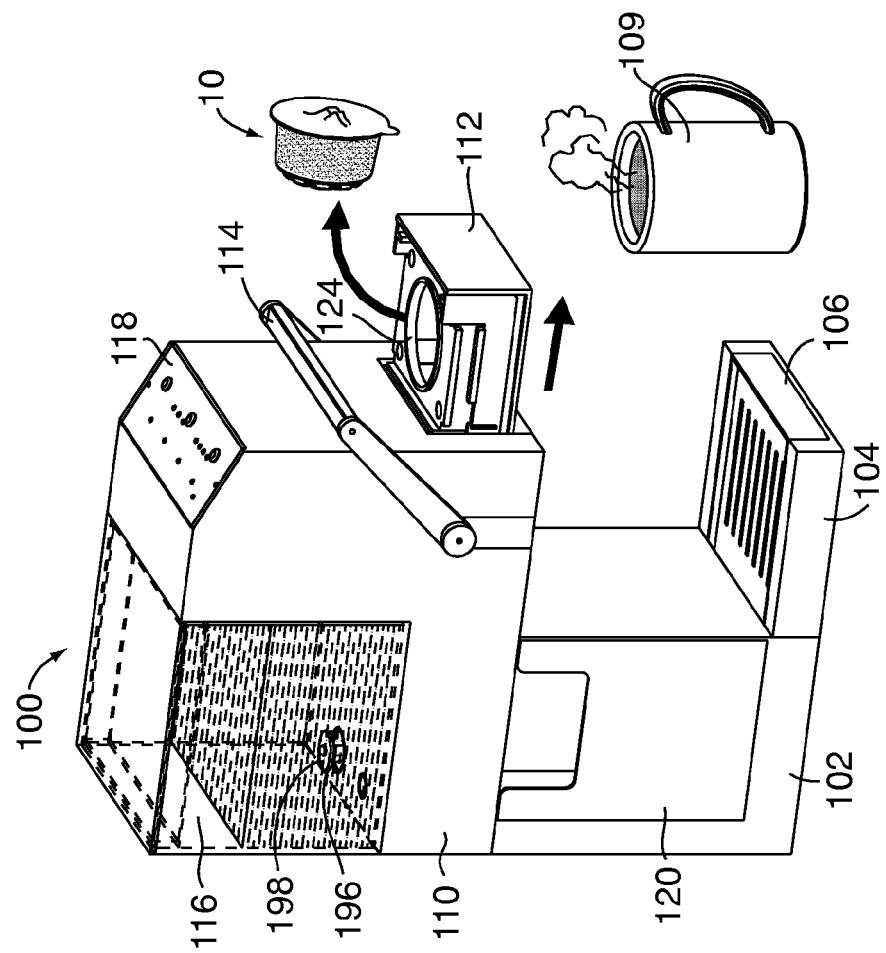
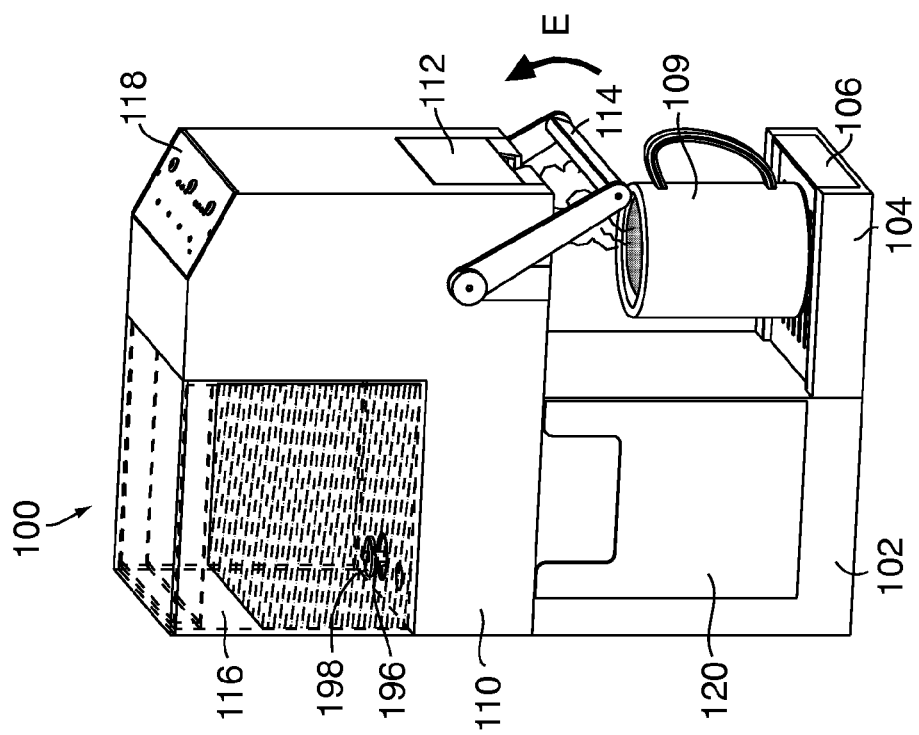

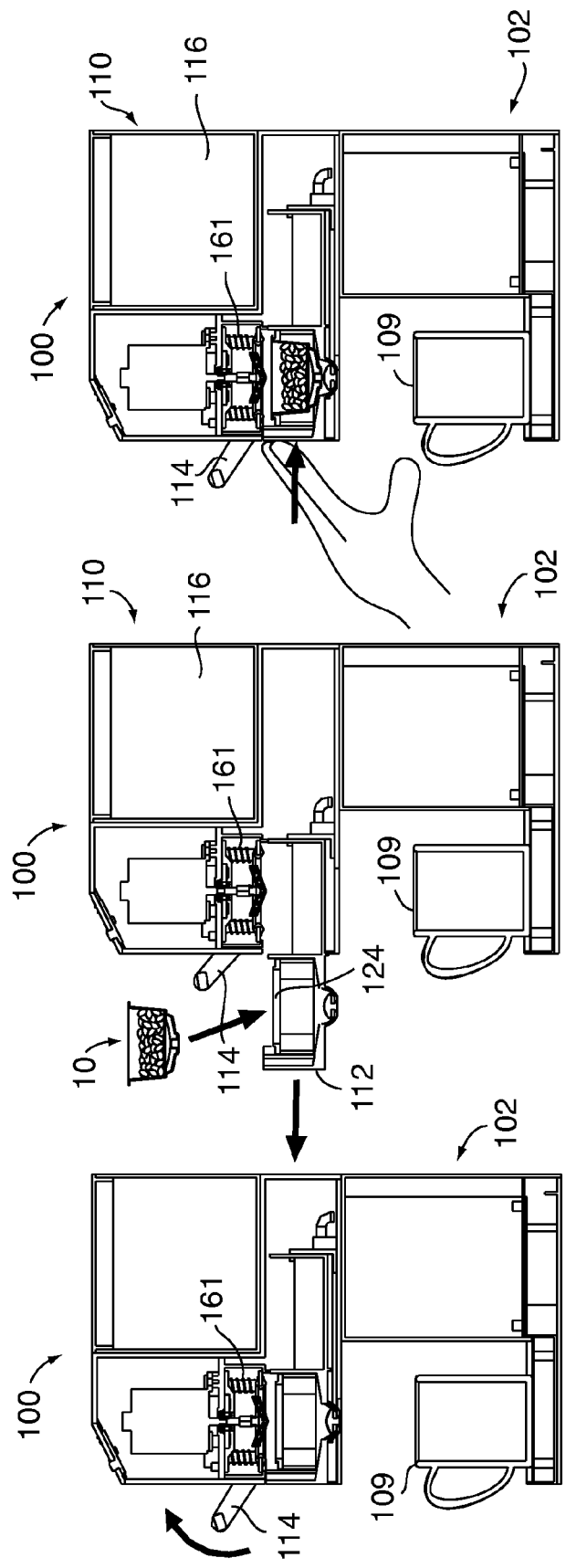

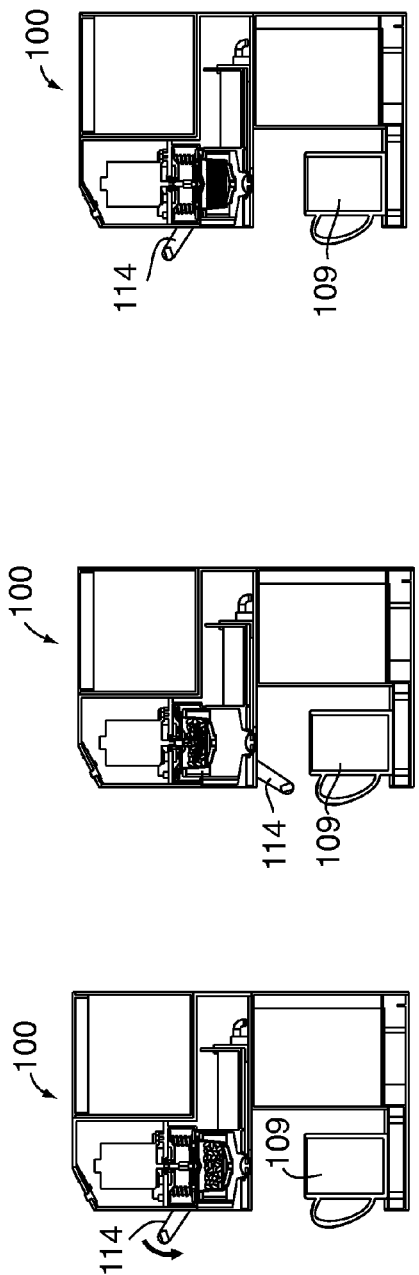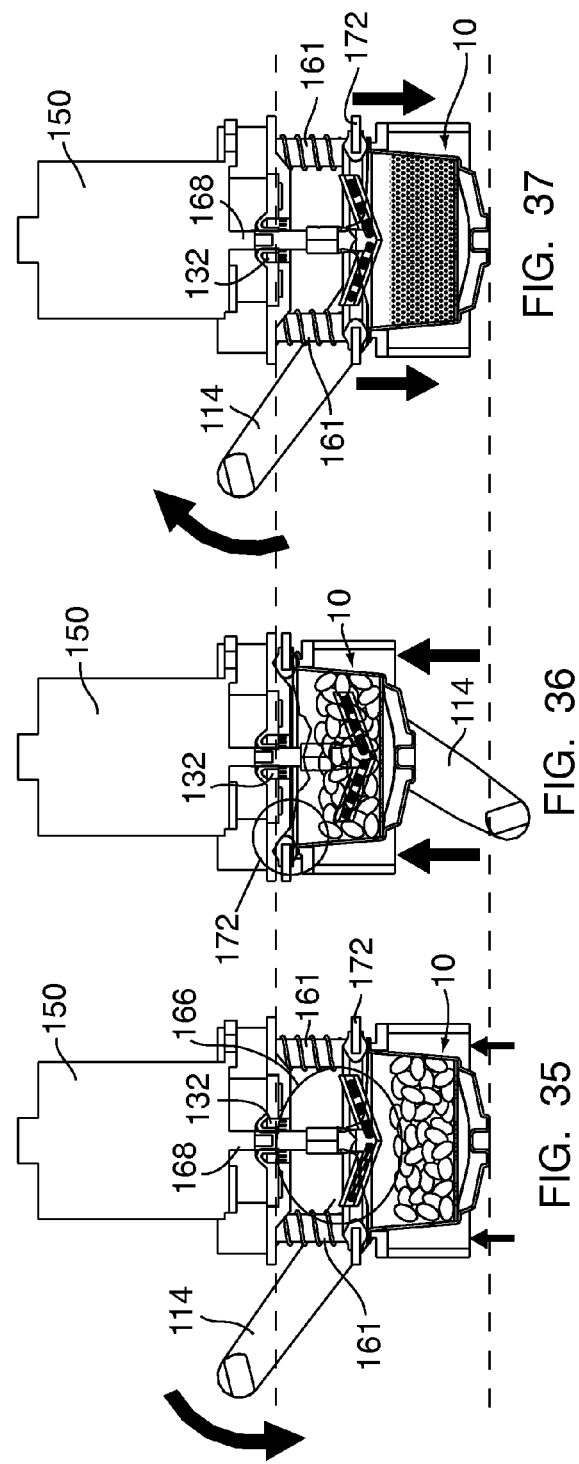
FIG. 35
FIG. 36
FIG. 37

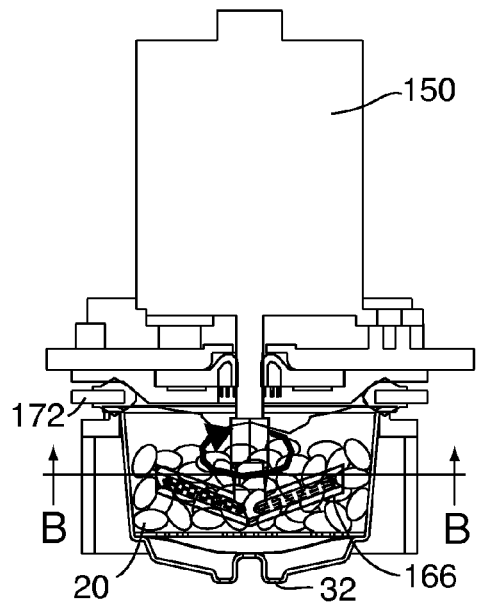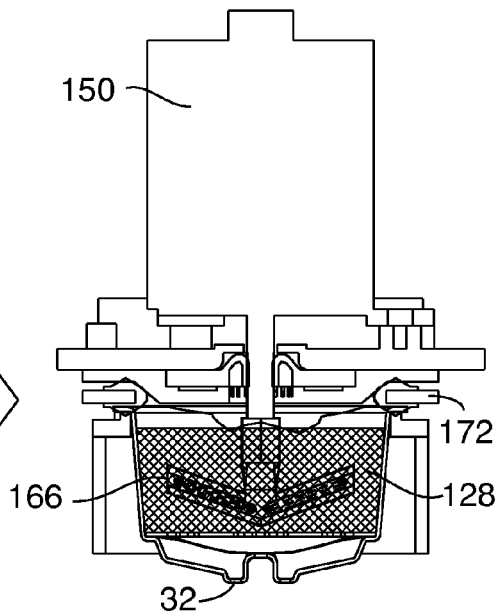
FIG. 48  FIG. 50
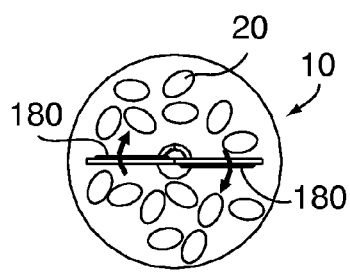
FIG. 49
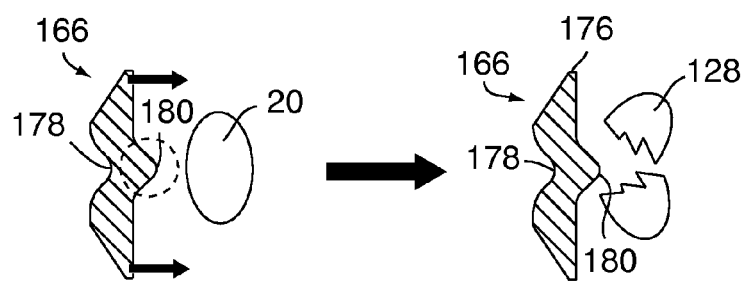
FIG. 51

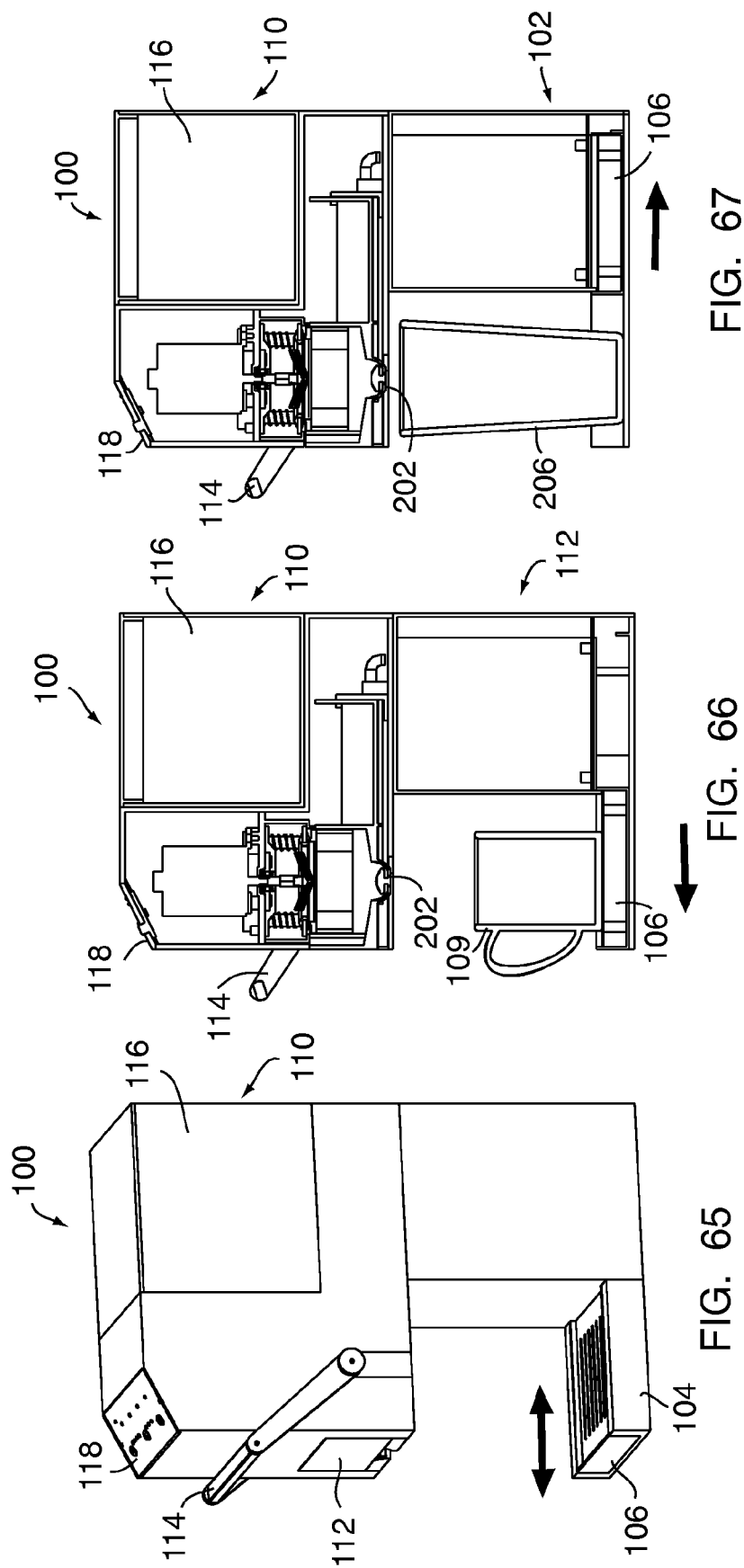

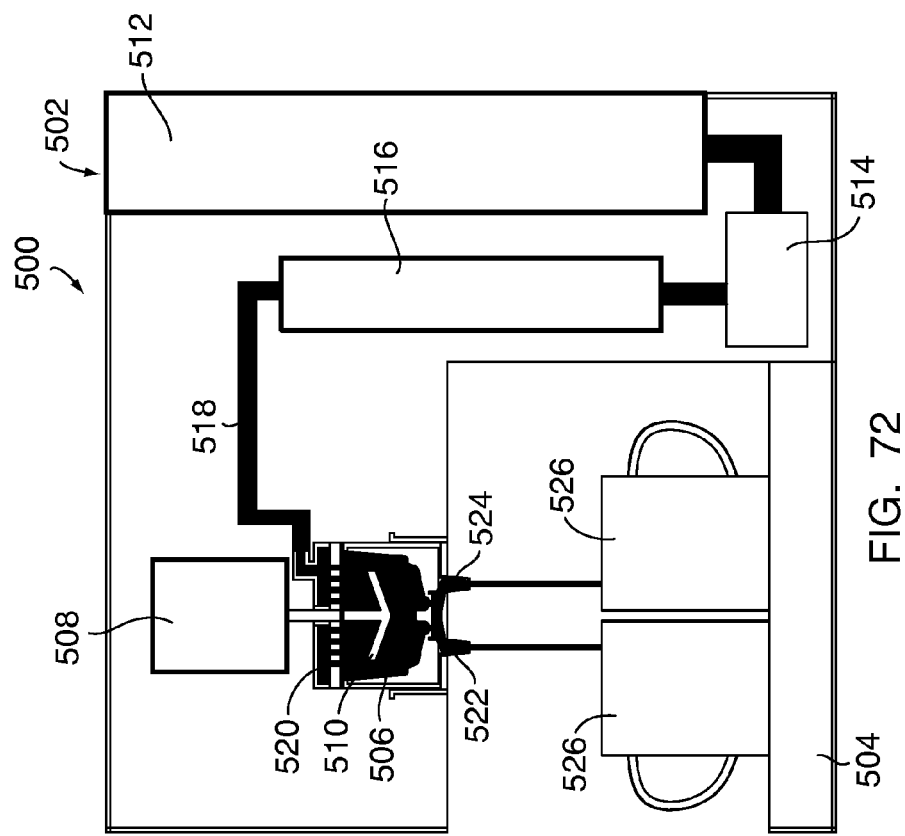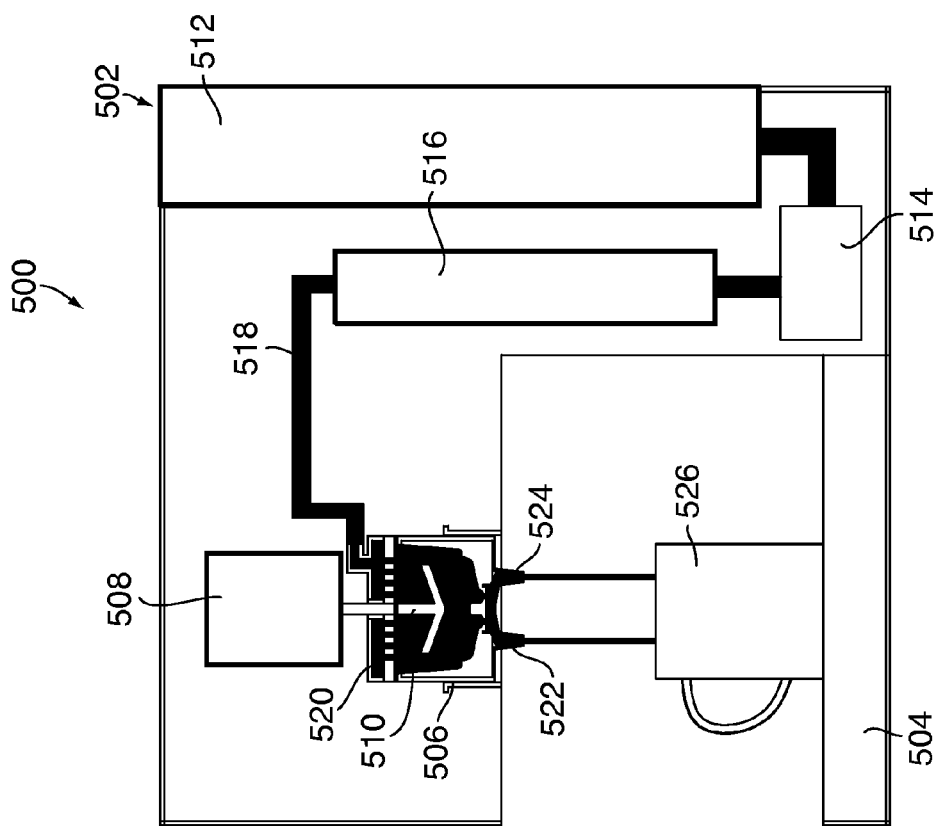

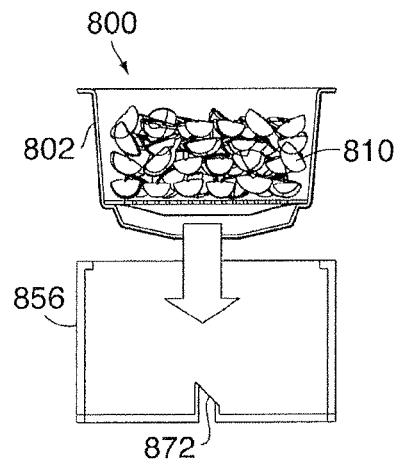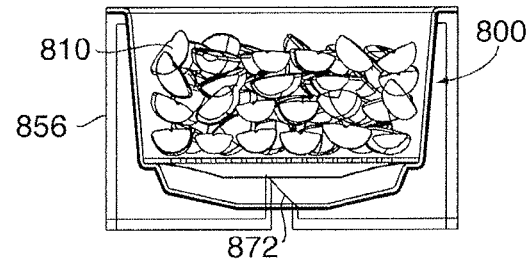
FIG. 90
FIG. 91
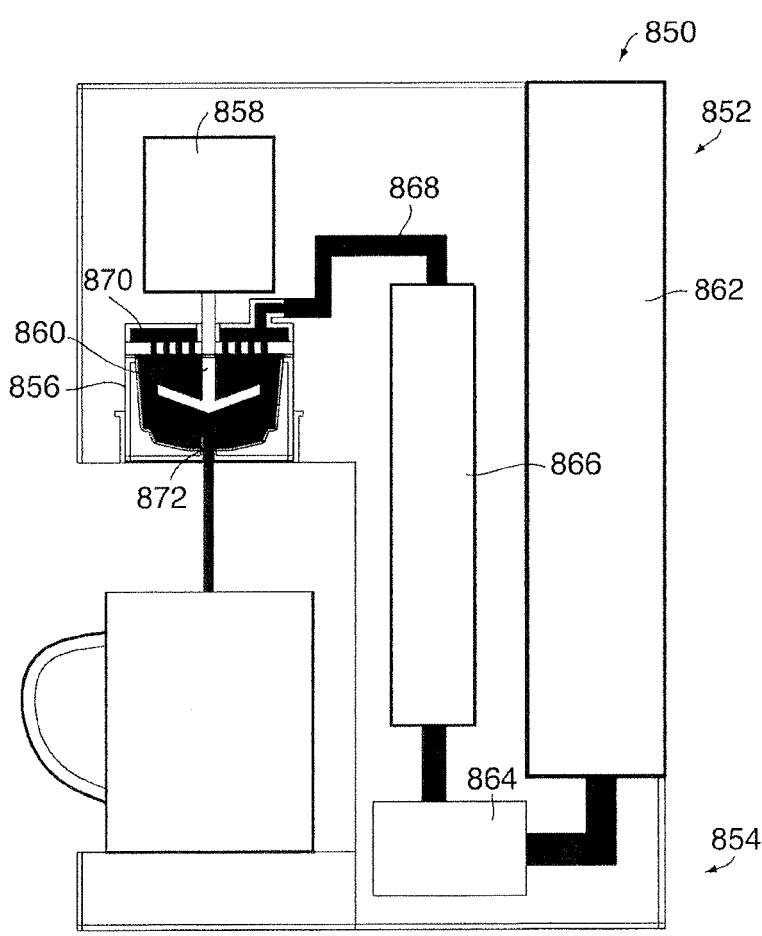
FIG. 89

BREWED BEVERAGE APPLIANCE AND METHOD

CROSS-REFERENCE TO RELATED APPLICATIONS

This application claims the benefit of U.S. Provisional Application Ser. No. 61/413,744, filed on Nov. 15, 2010, which is herein incorporated by reference in its entirety.

TECHNICAL FIELD

The present invention relates to brewed beverage appliances and, more particularly, to a brewed beverage appliance adapted to brew coffee from a pre-packaged, disposable container and filter combination.

BACKGROUND OF THE INVENTION

Various known coffee making appliances involve adding of coffee beans in one of various forms (i.e., ground or unground) to a container that is part of a machine in which heated water is delivered to the container and passes therethrough. The container typically includes a filtering mechanism so that heated water exiting the container is in the form of brewed coffee. Certain appliances require pre-ground coffee beans to be added in the form of "grounds." Other appliances are designed to accept whole coffee beans into a hopper or opening and include mechanisms that grind the beans into a ground form and then complete the brewing process. It is sometimes preferred to keep whole beans on hand for making coffee so that the coffee may be ground immediately prior to brewing, as this is believed to produce the freshest tasting coffee beverage. Yet other appliances required use of pods or pre-packaged coffee grounds in a serving-sized filter container to be inserted into the appliance. In such instances, the pre-packaged pods or containers are limited to being filled with ground coffee. Certain pre-packaged containers require placement into a separate filter mechanism in the appliance, while others have built-in filtering mechanisms.

SUMMARY OF THE INVENTION

It is an object of the present invention to provide a brewed beverage appliance and related method that include the benefits of brewing coffee from whole beans that are ground immediately before brewing and that are contained in a convenient, disposable, single-serving package.

These and other objects are achieved by the present invention.

A coffee making appliance in accordance with the present invention is directed to an appliance, a specialized reusable coffee container and filter, a specialized pre-packaged, airtight coffee container and filter, and a related brewing system and temperature control method utilizing the same. The container comprises, a cup-shaped body having a floor, a circumferential wall, and a top opening, a filter element positioned above the floor, at least one aperture formed in the floor, and a cover releasably attached to the cup body and covering the top opening. The cover includes a plurality of slits to allow for the insertion of a grinding blade. A plurality of whole roasted coffee beans are positioned within the container.

An air tight, single serve coffee container comprises a cup body having a floor, a circumferential sidewall, and a top opening. A filter element is positioned adjacent said floor and at least one drink ingredient is positioned adjacent the filter element. A cover is affixed to the cup body and covers the top opening to contain the at least one drink ingredient within said container. The drink ingredient may be whole roasted coffee beans.

An appliance comprises a base adapted to receive a brewed beverage receptacle, such as the reusable container or the air-tight container, a reservoir, a housing and a brewing tray in mechanical communication with the housing. The receptacle is dimensioned to receive a container containing at least one drink ingredient having particles of a first size. The appliance further comprises a grinding mechanism and a water delivery mechanism to deliver water from the reservoir to the container to mix with the drink ingredient to make a brewed beverage, and at least two outlet apertures positioned above the base and configured to receive the brewed beverage from the container and to separate the brewed beverage into two outlet streams. The two outlet streams may be directed into two separate cups.

Another appliance comprises a base adapted to receive a beverage receptacle, a reservoir, a housing, a receptacle in mechanical communication with the housing and dimensioned to receive a container containing at least one drink ingredient having particles of a first size, and a water delivery mechanism to selectively deliver water from the reservoir to one of a brewed beverage outlet in fluid communication with the receptacle, and a hot-water outlet.

A brewing and temperature control method for a beverage appliance comprises the steps of actuating a pump to produce a flow of water through a boiler, monitoring a temperature of the water adjacent an outlet of said boiler, and adjusting a flow rate of said water to said boiler in dependence upon the monitored outlet temperature of said water.

A related water heating and temperature control system for a beverage appliance comprises a reservoir for holding a volume of water, a boiler, a pump in fluid communication with the reservoir and the boiler for pumping water from the reservoir through the boiler to heat the water, and an outlet temperature sensor positioned adjacent an outlet of the boiler configured to monitor an outlet temperature of the water. The pump and outlet temperature sensor are electrically connected to a controller. The controller is configured to control a water flow rate from the pump in dependence upon the monitored outlet temperature.

BRIEF DESCRIPTION OF THE DRAWINGS

FIG. 15 is a top plan view of the coffee appliance of FIG. 9.

FIG. 16 is a bottom plan view of the coffee appliance of FIG. 9.

FIG. 19 is a perspective view of the coffee appliance of FIG. 9 illustrating the whole coffee bean pre-packaged filter cup of FIG. 1 in a loading tray.

FIG. 20 is a perspective view of the coffee appliance of FIG. 9 in a loaded state.

FIG. 23 is a perspective view of the coffee appliance of FIG. 9 subsequent to brewing a cup of coffee.

FIG. 24 is a perspective view of the coffee appliance of FIG. 9 illustrating the removal of a spent pre-packaged filter cup subsequent to brewing.

FIG. 31 a cross-sectional, schematic view of the coffee appliance of FIG. 9 in a mode of operation.

FIG. 32 a cross-sectional, schematic view of the coffee appliance of FIG. 9 in another mode of operation.

FIG. 33 a cross-sectional, schematic view of the coffee appliance of FIG. 9 in another mode of operation.

FIG. 35 is an enlarged, cross-sectional, schematic view of the coffee appliance of FIG. 9 in a mode of operation.

FIG. 36 is an enlarged, cross-sectional, schematic view of the coffee appliance of FIG. 9 in another mode of operation.

FIG. 37 is an enlarged, cross-sectional, schematic view of the coffee appliance of FIG. 9 in a mode of operation.

FIG. 48 is an enlarged schematic view of the coffee appliance of FIG. 1 in a grinding mode.

FIG. 49 is a cross-sectional view of the coffee appliance of FIG. 1 in a grinding mode, taken along line B-B of FIG. 48.

FIG. 50 is an enlarged schematic view of the coffee appliance of FIG. 1 subsequent to grinding coffee beans.

FIG. 51 is an enlarged schematic view of the grinding blade of the coffee appliance of FIG. 1 grinding a coffee bean according to the present invention.

FIG. 65 is a perspective view of a coffee appliance having a slidable drip tray according to the present invention.

FIG. 66 is a cross-sectional view of the coffee appliance of FIG. 65 showing the slidable drip tray in an extended position.

FIG. 67 is a cross-sectional view of the coffee appliance of FIG. 65 showing the slidable drip tray in a retracted position.

FIG. 71 is a schematic view of a dual-serving coffee appliance in accordance with another embodiment of the present invention.

FIG. 72 is a schematic view of the dual-serving coffee appliance of FIG. 71.

FIG. 89 is a schematic view of a coffee appliance in accordance with yet another embodiment of the present invention.

FIG. 90 is a side, cross-sectional view of a tray and filter cup of the coffee appliance of FIG. 89, illustrating a filter cup insertion step.

FIG. 91 is a side, cross-sectional view of a tray and filter cup of the coffee appliance of FIG. 89, illustrating the puncturing of the filter cup.

DETAILED DESCRIPTION OF THE PREFERRED EMBODIMENTS

Figure 1:
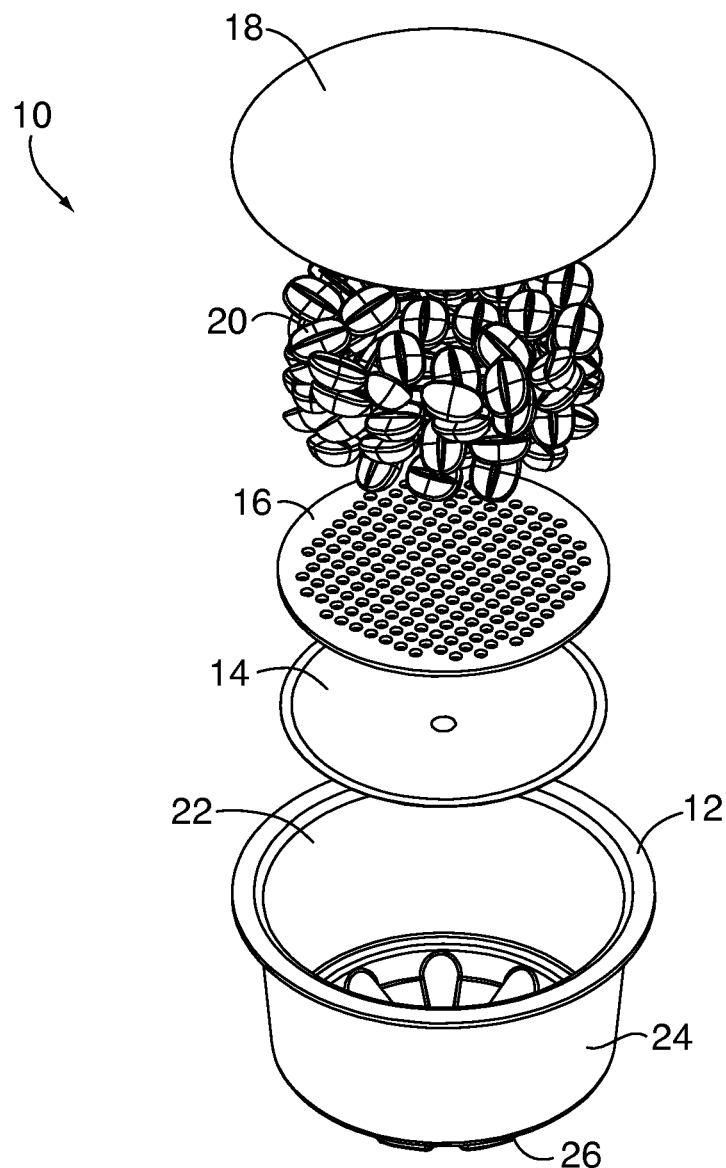
FIG. 1 is an exploded view of a whole coffee bean pre-packaged filter cup according to the present invention.
Figure 2:
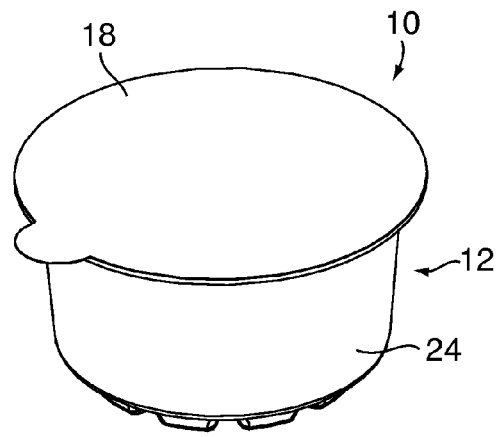
FIG. 2 is a perspective top view of the whole coffee bean pre-packaged filter cup of FIG. 1.
Figure 3:
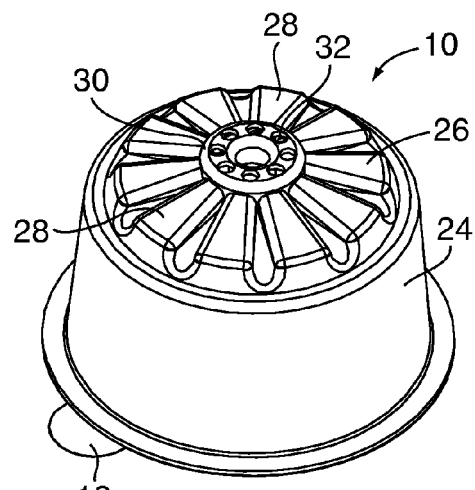
FIG. 3 is a perspective bottom view of the whole coffee bean pre-packaged filter cup of FIG. 1.
Figure 4:
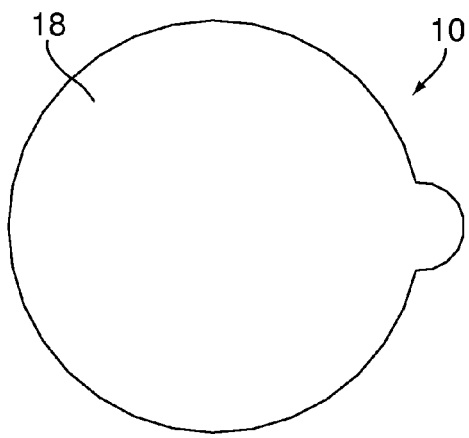
FIG. 4 is a top plan view of the whole coffee bean pre-packaged filter cup of FIG. 1.
Figure 5:
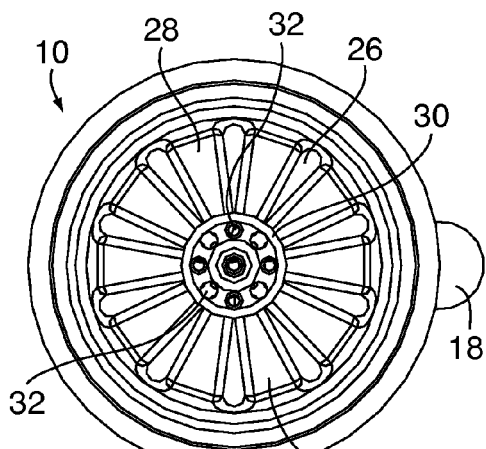
FIG. 5 is a bottom plan view of the whole coffee bean pre-packaged filter cup of FIG. 1.
Figure 6:
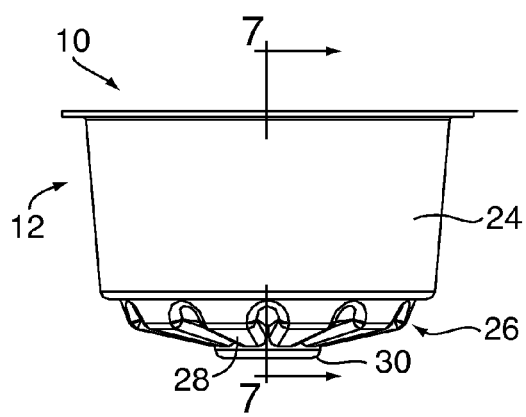
FIG. 6 is a side elevational view of the whole coffee bean pre-packaged filter cup of FIG. 1.

Referring to FIGS. 1-7, a filter cup 10 for use with an appliance according to the present invention includes a cup 12, a paper/fabric filter 14, a plastic screen 16 and a foil cover 18. The filter 14 prevents coffee grounds and/or other sediment from exiting the cup 12 during brewing but permits passage of liquid. The cover 18 may be formed from aluminum or other material known in the art, and is preferably heat-sealed or otherwise releasably affixed to the top rim of the cup 10. A plurality of whole coffee beans 20 are enclosed in the space between the foil cover 18 and the plastic screen 16. While FIG. 1 shows coffee beans housed in the filter cup 10, other types of food and substances, such as tea and the like, may be used in similar fashion to that described herein, without departing from the broader aspects of the present invention.

Figure 7:
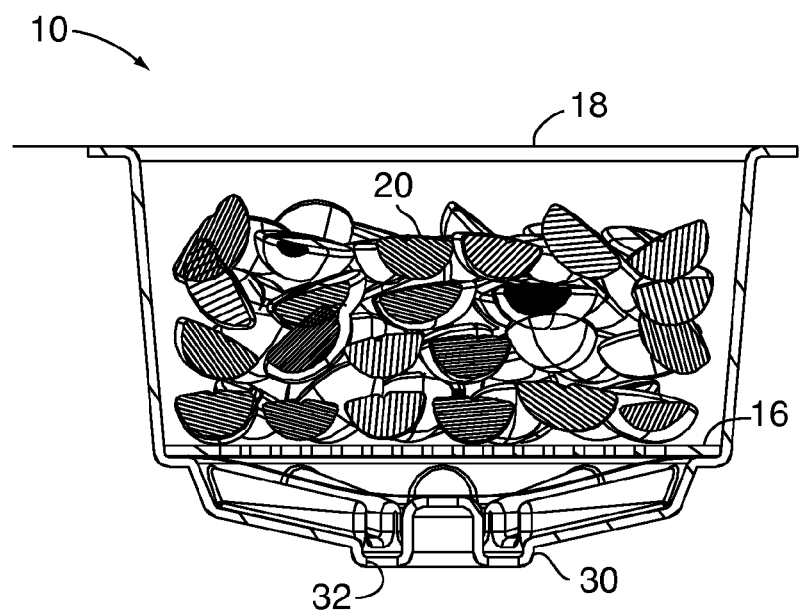
FIG. 7 is a side cross-sectional view of the whole coffee bean pre-packaged filter cup of FIG. 1 taken along line A-A of FIG. 6.

As further shown in FIG. 1, the cup 12 has an opening 22 at the top thereof, a circumferential sidewall 24 and a floor 26. As best shown in FIGS. 2-7, the floor 26 has a plurality of grooves or channels 28 that direct a flow of fluid to a circular depression or recess 30 having one or more apertures 32. Importantly, the recess 30 is the lowest portion of the cup 10 such that brewed coffee collects in the recess 30 and exits the cup through the apertures 32, as discussed hereinafter. FIG. 7 illustrates the cup 10 in an assembled state and containing coffee beans 20. As shown therein, the paper filter 14 is positioned on the floor 26 of the cup 12. The plastic screen 16 is positioned on top of the paper filter 14 and protects the paper filter 14 from abrasion caused by a grinding blade and/or coffee grounds. Both the paper filter 14 and the screen 16 are circular and sized to be closely received by the circumferential sidewall 24 of the cup at the bottom thereof. As best shown in FIG. 7, the screen 16 may be resilient and resistant to bending such that the screen 16 provides a flat surface in the cup 12 on top of which coffee bean 20 may rest. Importantly, the screen 16 prevents the coffee beans 20 from falling to the floor 26 of the cup 12 (which may be out of reach of a grinding blade) to facilitate optimal grinding by the grinding blade, as discussed in detail hereinafter. As discussed above, the foil cover 18 seals the filter 14, screen 16 and coffee beans 20 inside the cup 12.

The cup 10 may be stored and transported in a separate sealed package or wrapper for additional freshness and protection, and the apertures 32 in the floor 26 may be covered with, for example, an adhesive label (not shown). In the preferred embodiment, the filter cup 10 is a pre-packaged, single-use, disposable component. Thus, it is sealed by the foil cover 18 in an air-tight manner to preserve freshness and flavor and to protect the coffee beans 20 from moisture and contamination. As discussed above, the filter cup 10 may be sealed by the foil cover 18 and an adhesive label, or may be packaged in a wrapper with or without the adhesive label. In an alternative embodiment, it is contemplated that the filter cup 10 may instead be a re-usable cup that is re-filled for each use. In an embodiment, the floor 26 of the cup may be formed without apertures 32. In this embodiment, the floor of the cup 26 may be pierced by a needle upon insertion into a coffee appliance to provide an exit for the flow of brewed coffee.

Figure 8:
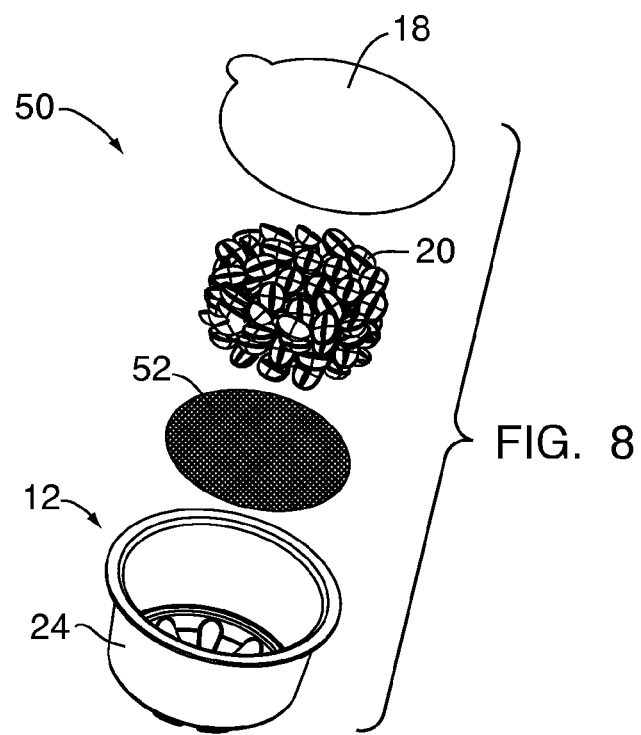
FIG. 8 is an exploded view of a whole coffee bean pre-packaged filter cup according to another embodiment of the present invention.

Referring now to FIG. 8, an alternative construction of a filter cup 50 is shown. As shown therein, the cup 50 is substantially similar in shape and construction as the cup 10, however, a metal mesh filter 52 may be utilized in place of the paper/fabric filter 14 and the protective plastic screen 16. In this embodiment, the metal mesh filter 52 is fine enough such that it prevents coffee grounds from exiting the cup 10 and also provides a level of abrasion resistance. While it is disclosed that the filter 34 may be formed from a metal mesh, other materials substantially resistant to abrasion from the grinding blade and/or coffee grounds may also be utilized without departing from the broader aspects of the present invention.

Referring to FIGS. 9-24, an appliance 100 according to an embodiment of the present invention is shown. The appliance 100 is intended to be used in combination with the filter cup 10, disclosed above, in order to brew a coffee or other beverage. As shown therein, the appliance 100 is generally rectangular in shape and comprises a base 102 and a drip tray housing 104 slidably receiving a drip tray 106 having a slotted or grated top surface 108. The surface 108 of the tray 106 is adapted to have a container, such as a coffee mug 109, placed upon it to receive brewed coffee as it is produced by and emitted from the appliance 100. As will be readily appreciated, the slotted surface 108 permits liquid that may be spilled from the cup 109 or that miss the cup 109 during operation to pass through the surface 108 and collect in the drip tray 106, for easy cleanup.

Figure 9:
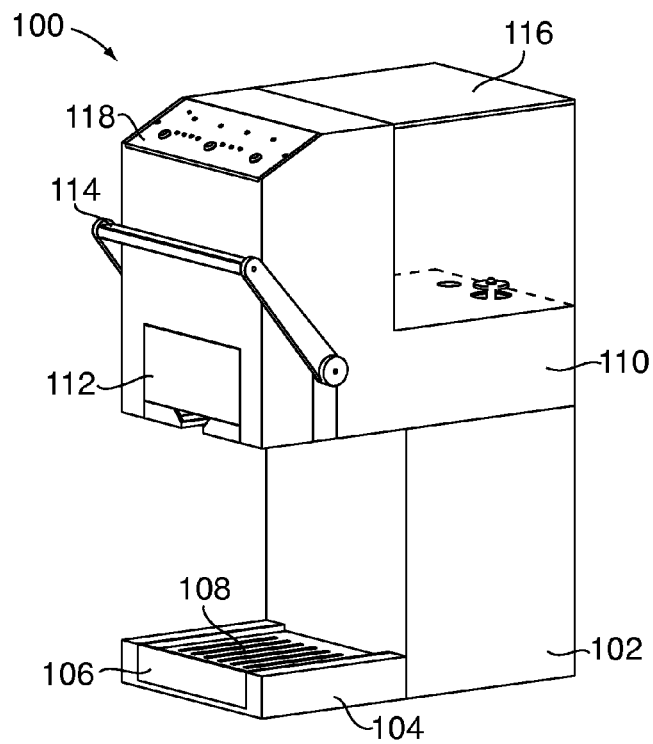
FIG. 9 is a perspective right side view of a coffee appliance according to the present invention.
Figure 10:
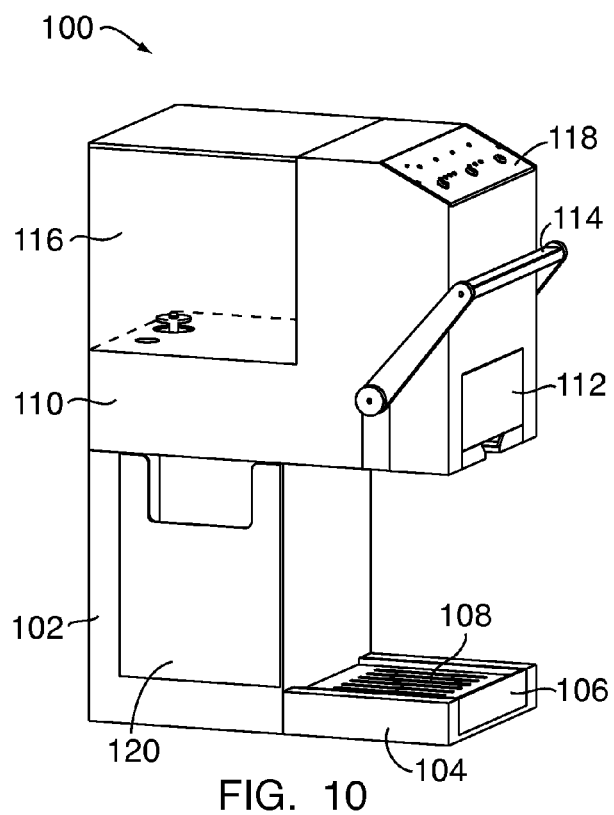
FIG. 10 is a perspective left side view of the coffee appliance of FIG. 9.
Figure 11:
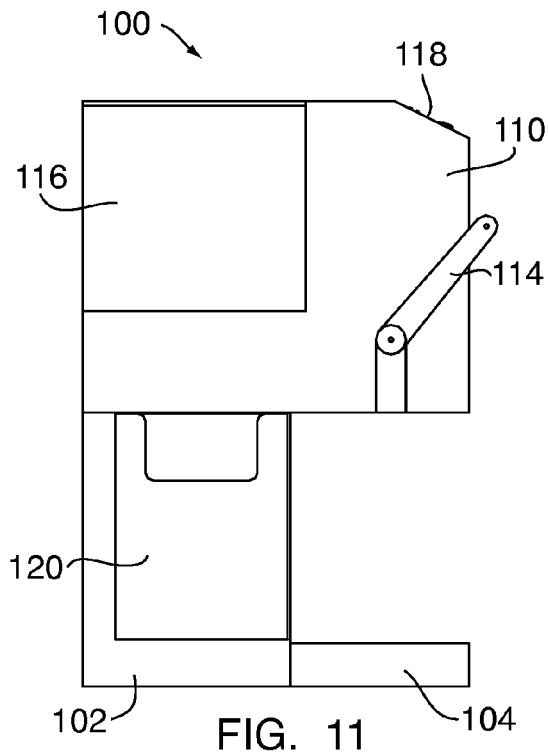
FIG. 11 is a left side elevational view of the coffee appliance of FIG. 9.
Figure 12:
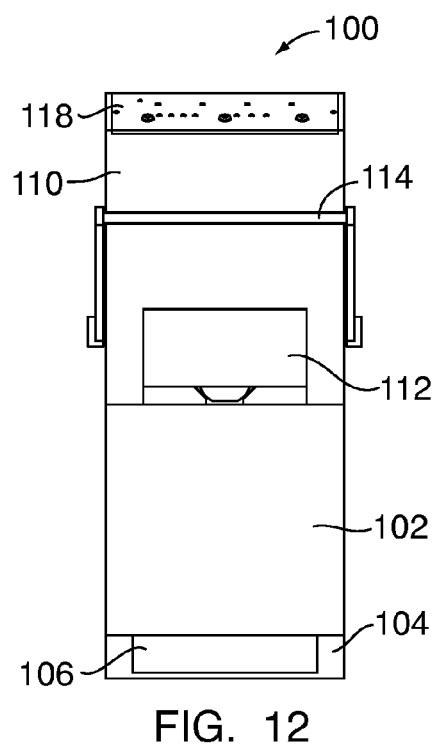
FIG. 12 is a front elevational view of the coffee appliance of FIG. 9.
Figure 13:
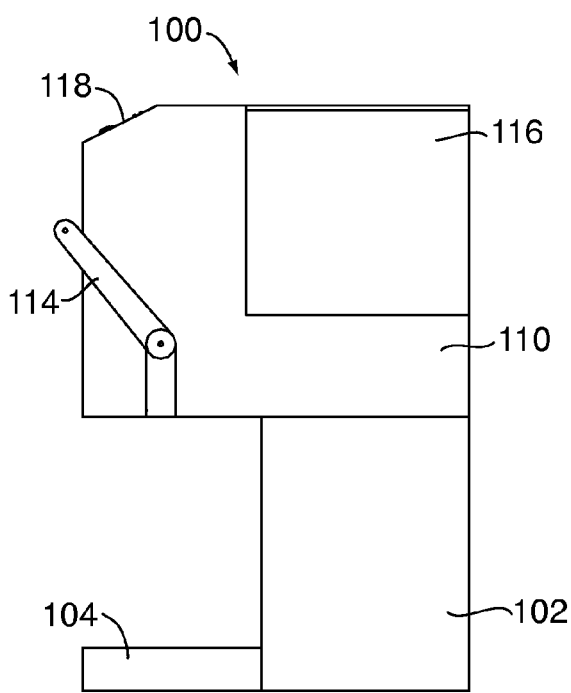
FIG. 13 is a right side elevational view of the coffee appliance of FIG. 9.
Figure 14:
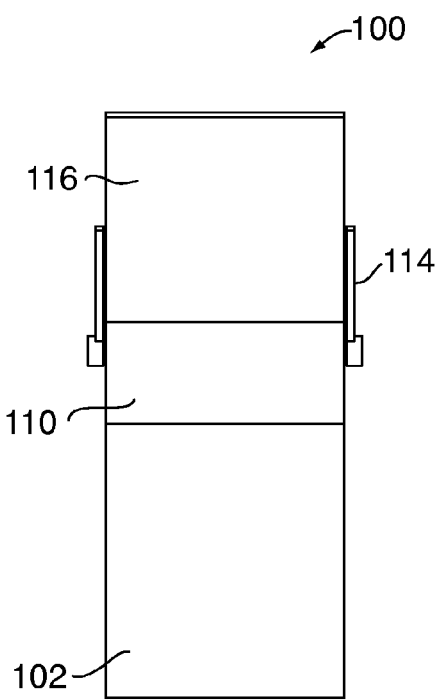
FIG. 14 is a rear elevational view of the coffee appliance of FIG. 9.

A housing 110 is located above, and supported by, the base 102 and slidably receives a filter cup housing/tray 112 for securing and positing the filter cup 10 during use. A handle 114 is pivotally mounted to the housing 110 for operation, as described below. As further shown in FIGS. 9 and 10, a water reservoir 116 is attached to, supported by, and otherwise forms a part of the housing 17. In an embodiment, the water reservoir 116 may be removably or permanently mounted to the housing 110. The housing 110 also includes a control panel 118 for controlling operational features of the appliance, as discussed hereinafter. As best shown in FIG. 9, the base 102 includes a recess on one side there for slidably receiving a discard tank 120 for receiving water from a cleaning operation of the appliance 100 (described below) and discarded filter cups 10 after use. In an alternative embodiment, the tray 112 may be pivotally received by the housing 110 and movable between a first position in which the housing/tray 112 is received within the housing, and a second position in which the tray 112 is pivoted away from the housing and towards a user to facilitate the installation of a filter cup 10. In an embodiment, the tray 112 is removable from the housing 110 for cleaning.

Figure 17:
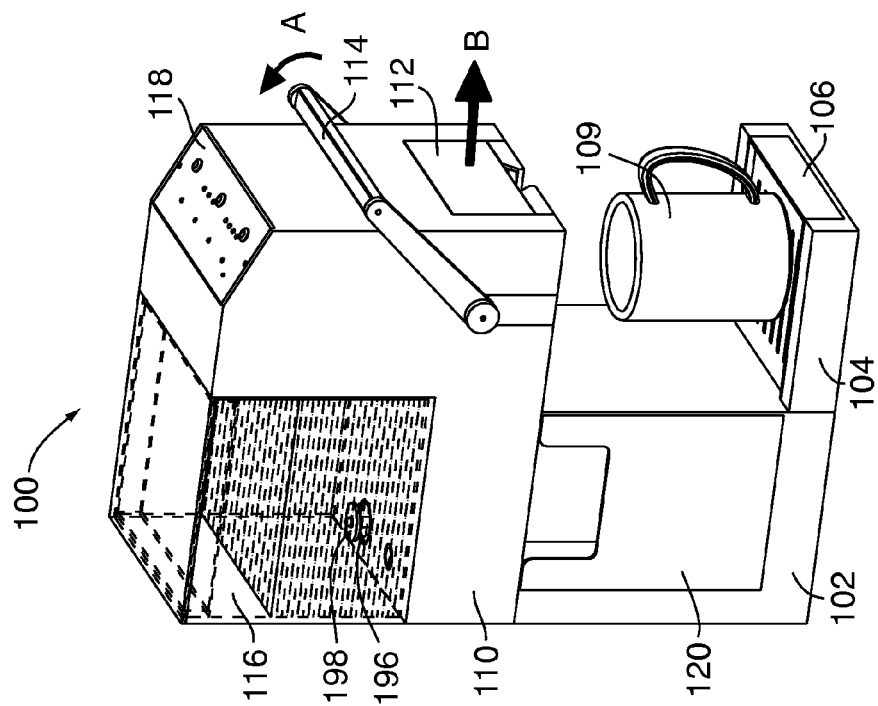
FIG. 17 is a perspective view of the coffee appliance of FIG. 9 illustrating a ready mode thereof.

Operation of the appliance 100 will now be described with specific reference to FIGS. 17-24. First, the water reservoir 116 is filled with water. A user then selects the desired coffee settings from the control panel 118. Settings may include selectable options such as coffee strength and serving size, timer setting, automatic brew, etc. The handle 114 is then moved upwardly in the direction of arrow A, as shown in FIG. 17, in order to unlock the tray 112 from its seated and retained position within the housing 110. The tray 112 slides out from the appliance 100 in the direction of arrow B to the position shown in FIG. 18, under force of a spring 154. In this position, the tray 112 is ready for a filter cup 10 to be placed into the receiving bracket 124 in the tray 112.

After the cup 10 is inserted into the tray 112, the tray 112 is now ready to be pushed back into the appliance 100 in the direction of arrow C, as shown in FIG. 19. In particular, the tray 112 is pushed manually back into the appliance 100 so that it is received by the housing 110 in locked position, as shown in FIG. 20. The handle 114 is then lowered in the direction of arrow D in order to automatically initiate the grinding and brewing processes.

Figure 21:
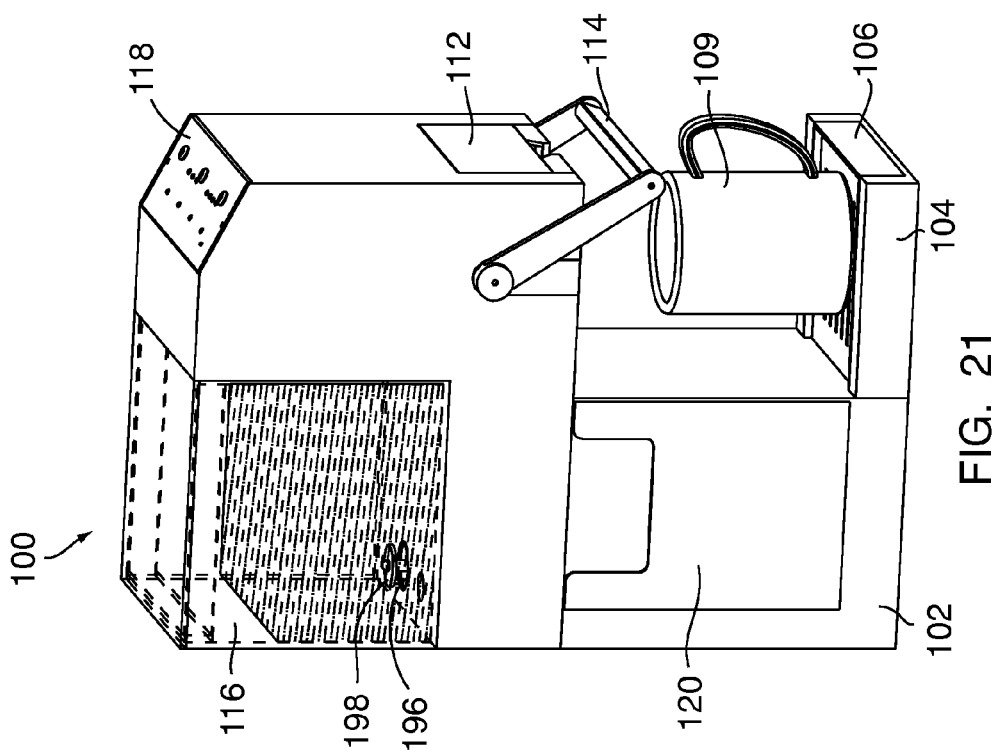
FIG. 21 is a perspective view of the coffee appliance of FIG. 9 in a brew-ready state.

Referring to FIG. 21, as noted above, the grinding process starts automatically after the handle 114 is lowered. In the process, the coffee beans 20 in the filter cup 10 are ground by a grinding blade 126 that is received within the cup 10 so that the beans 20 are turned into coffee grounds 128. After grinding is completed, heated water is delivered into the cup 10 from a water outlet described hereinafter. As represented by the arrow 130 in FIG. 22, coffee is emitted from the bottom of the tray 112, which has an opening to enable such emission, into the coffee mug 109 positioned beneath the tray 112.

After the brewing process is complete, the handle 114 is raised from the position shown in FIG. 23 in the direction of arrow E to the position shown in FIG. 24. Again, movement of the handle 114 to its upper position unlocks the tray 112 so that it slides out of the housing 110 appliance 100, permitting the user to manually remove the used filter cup 10 from the tray 112. The cup 110 may then be discarded into the discard tank 120. The filled mug 109 of coffee may be removed from the drip tray 106 before or after this step.

Figure 59:
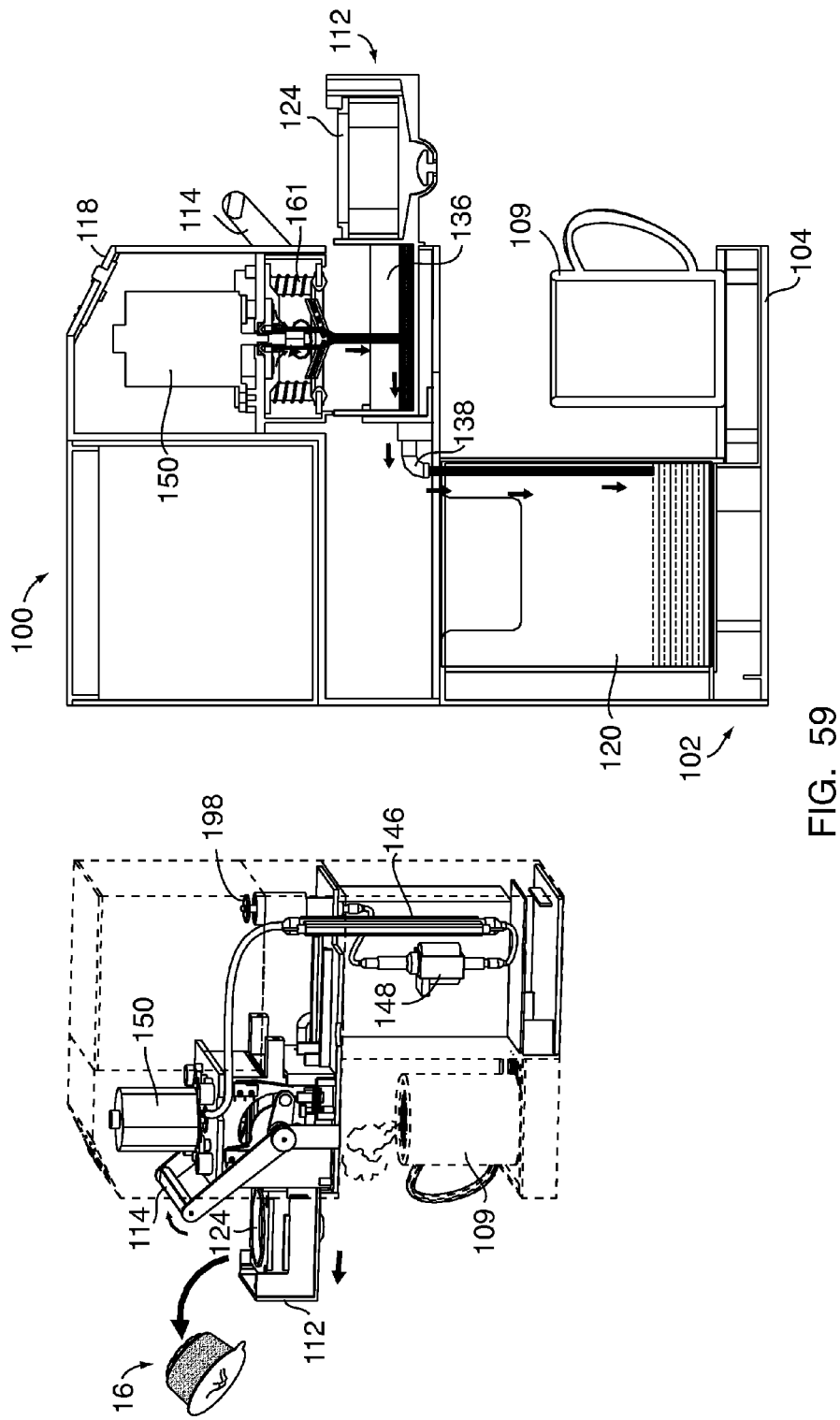
FIG. 59 is a schematic, cross-sectional view of the coffee appliance of FIG. 9 illustrating a cleaning mode.

In an embodiment, while the tray 112 is in the out position, as shown in FIG. 24, a blade cleaning operation automatically begins. In the blade cleaning operation water is emitted from the water outlet 132. Because the cup 10 has been removed, the blade is surrounded by space thereby enabling the flowing water to rinse it clean. In an embodiment, the blade may rotate during application of water to facilitate cleaning. Since the tray 112 is in the out position, the water will not drain out of the bottom of the cup 10 and tray 112, as it does in the brewing mode. Instead, the water is diverted because it falls into the rear end 134 of the tray 112 into a collection pan 136, as is shown in FIG. 59. The water exits from the collection pan 136 of the tray 112 via a discard tube 138 and falls into the discard tank 120.

In an alternative embodiment, a cup containing a cleaning liquid such as water may be utilized to clean the blade 166 either periodically or after each use. In this embodiment, a cleaning cup is inserted into the receptacle 124 and the appliance 100 is actuated by pulling the handle 114 downward. The appliance 100 may then run a normal brewing cycle. Alternatively, a button on the control panel 118 may be depressed to run a cleaning cycle. The cleaning cycle may be specifically configured, e.g., water temperature, run time, blade rotation speed, to optimize blade cleaning and sterilization. In alternative embodiments, the cleaning cup may contain a cleaning solution or a slurry of cleaning ingredients. The cleaning ingredients may be liquid or dry and may take the form of granules, powder, etc.

In yet another embodiment, a cleaning operation may including running a brewing cycle without actually inserting a filter cup 10. In this embodiment, the handle 114 may be moved downward to begin the cycle such that heated water is passed over the stationary or rotating blade 166 to clean the blade. Alternatively, a button on the control panel 118 may be depressed to initiate the cleaning cycle.

Figure 62:
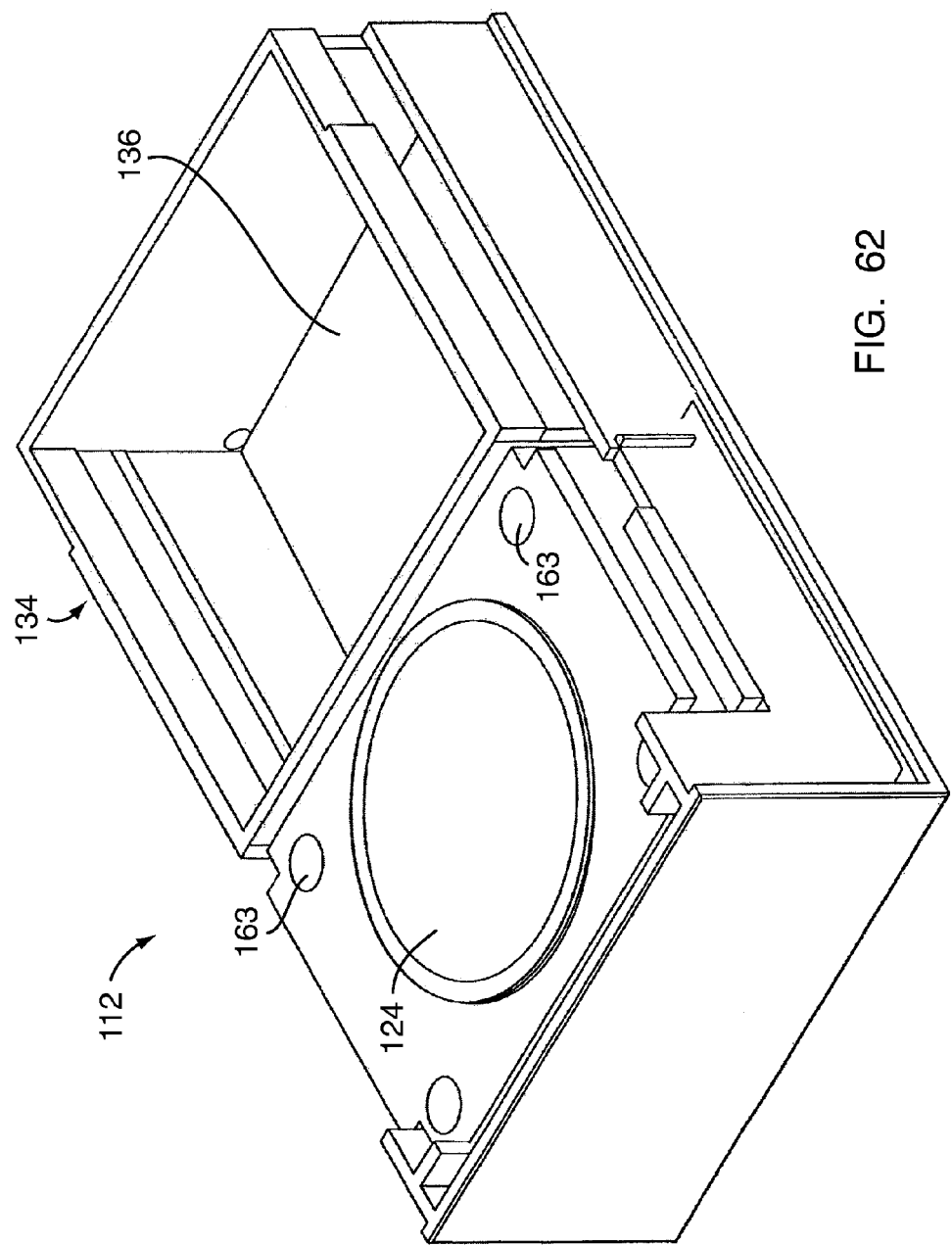
FIG. 62 is a perspective view of a tray for receiving the whole coffee bean pre-packaged filter cup of FIG. 1.
Figure 63:
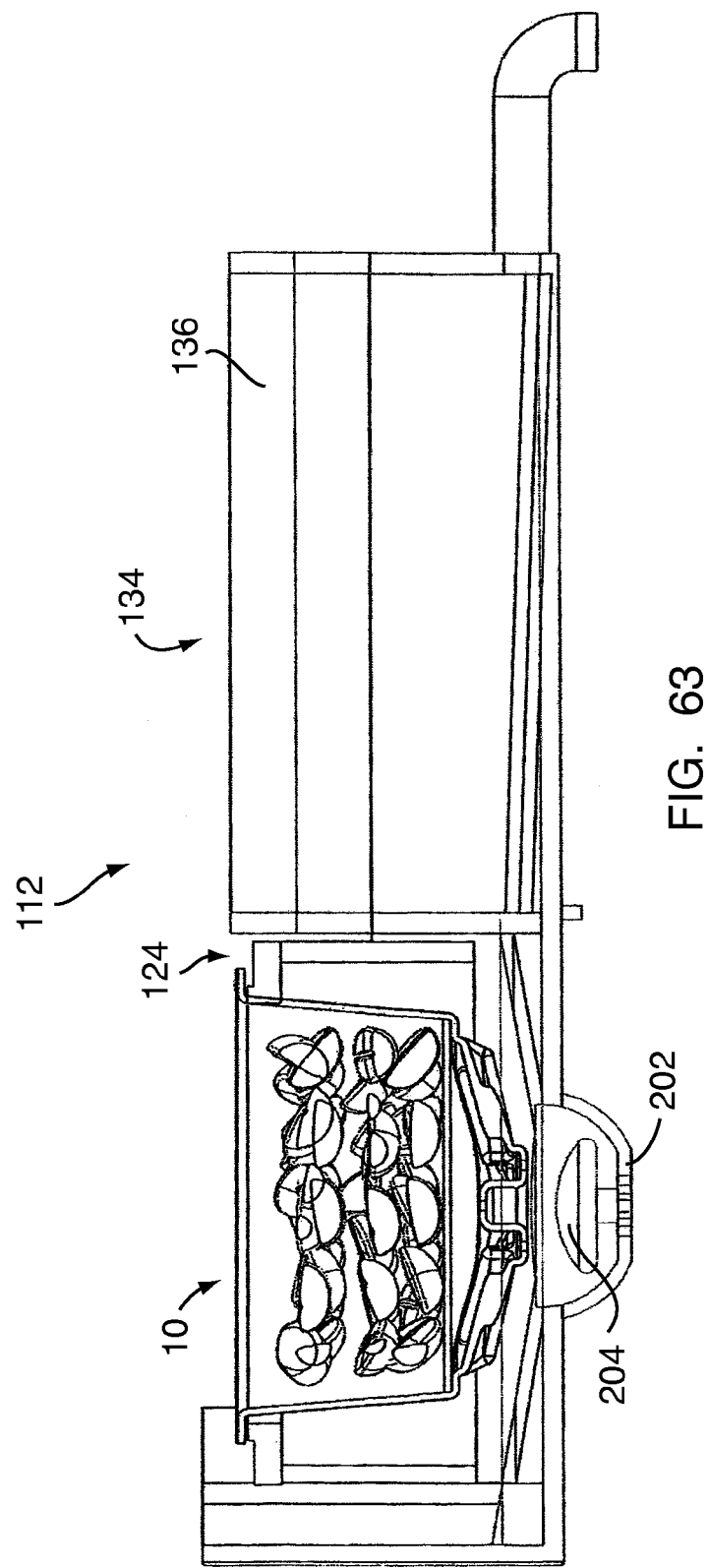
FIG. 63 is a side, cross-sectional view of the tray of FIG. 62.
Figure 64:
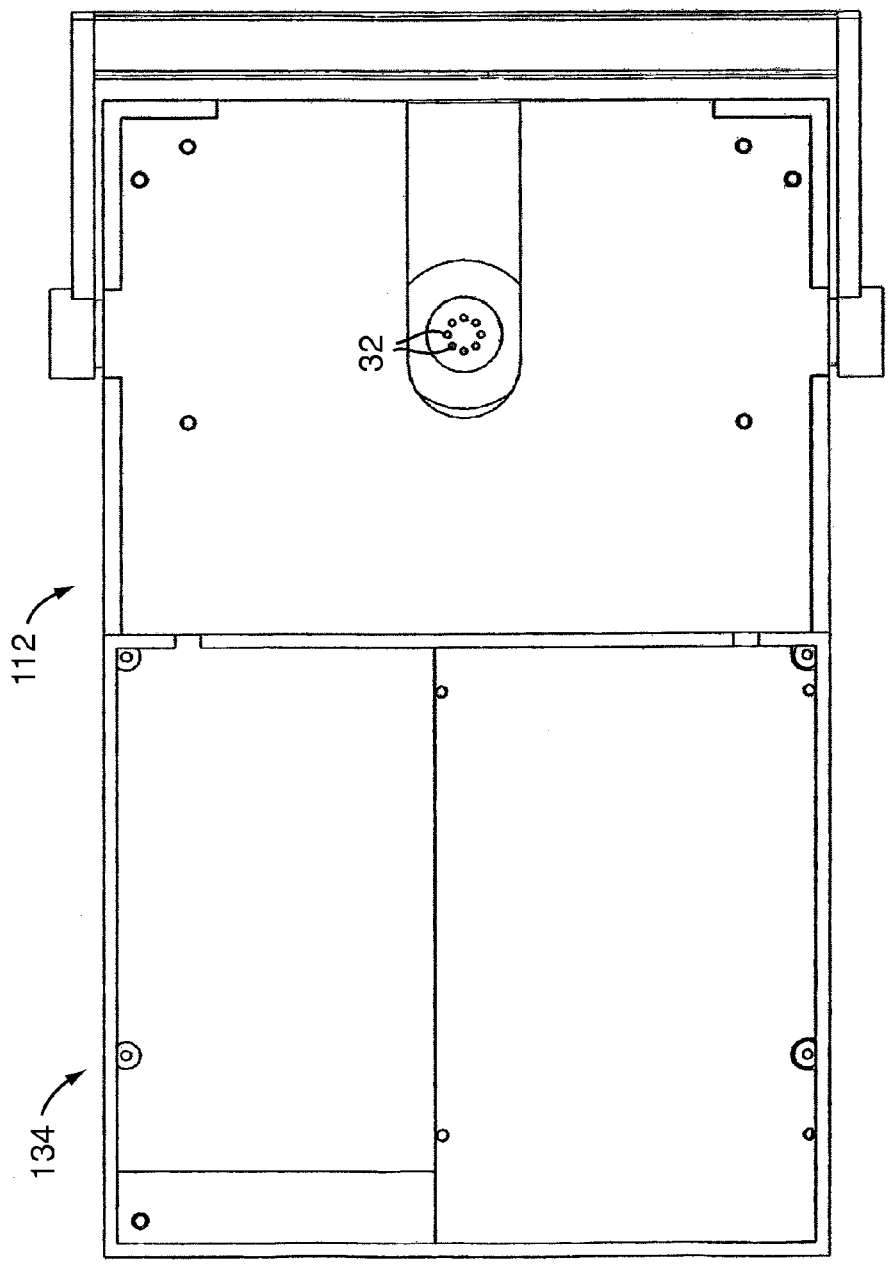
FIG. 64 is a bottom plan view of the tray of FIG. 62 view of a tray component of an appliance according to the present invention.

FIGS. 62 and 63 illustrate the tray 112 and the collection pan 136. FIG. 64 illustrates the bottom view of the tray 112 and shows the openings 32 of the cup 10 as viewed through an opening 140 in the bottom of the tray 112 that permits brewed coffee to flow out.

Figure 25A:
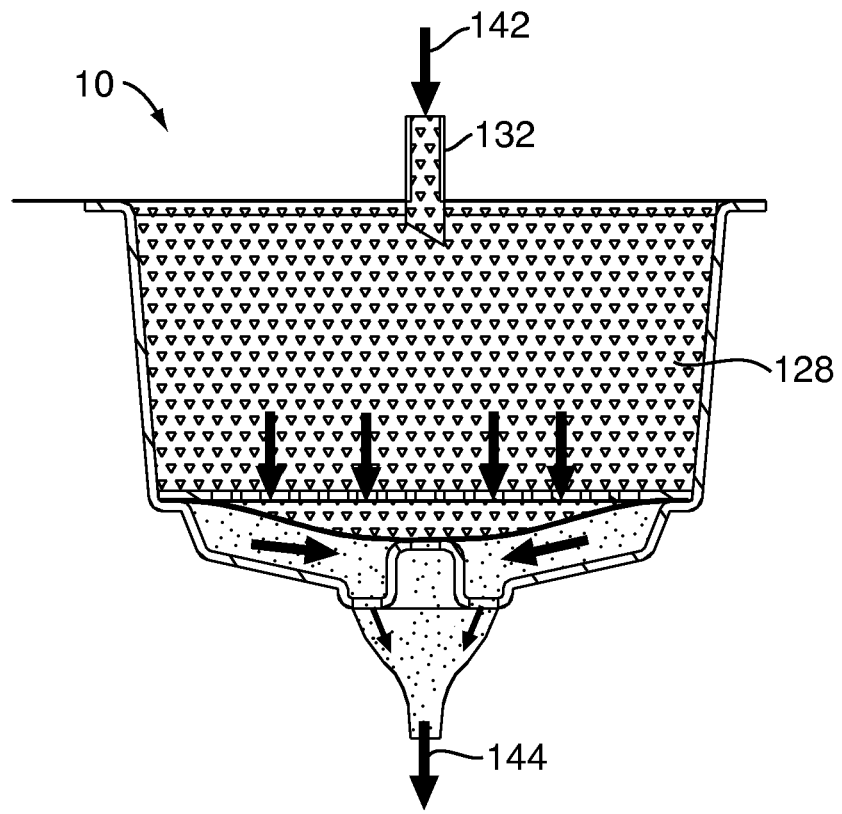
FIG. 25A is a schematic view of the whole coffee bean pre-packaged filter cup of FIG. 1 illustrating water flowing through during a brewing mode.

FIG. 25A schematically illustrates how ground coffee 128, which is ground from whole coffee beans 20 in a procedure described below, is infused with heated water to produce coffee. The ground coffee 128 is located in the cup 10 and heated water is introduced from above through a water outlet 132 as indicated by the arrow 142. The heated water flows through the ground coffee 128 in the cup 10 and exits from the apertures 32 in the bottom of the cup 10 as shown by arrow 144.

Figure 18:
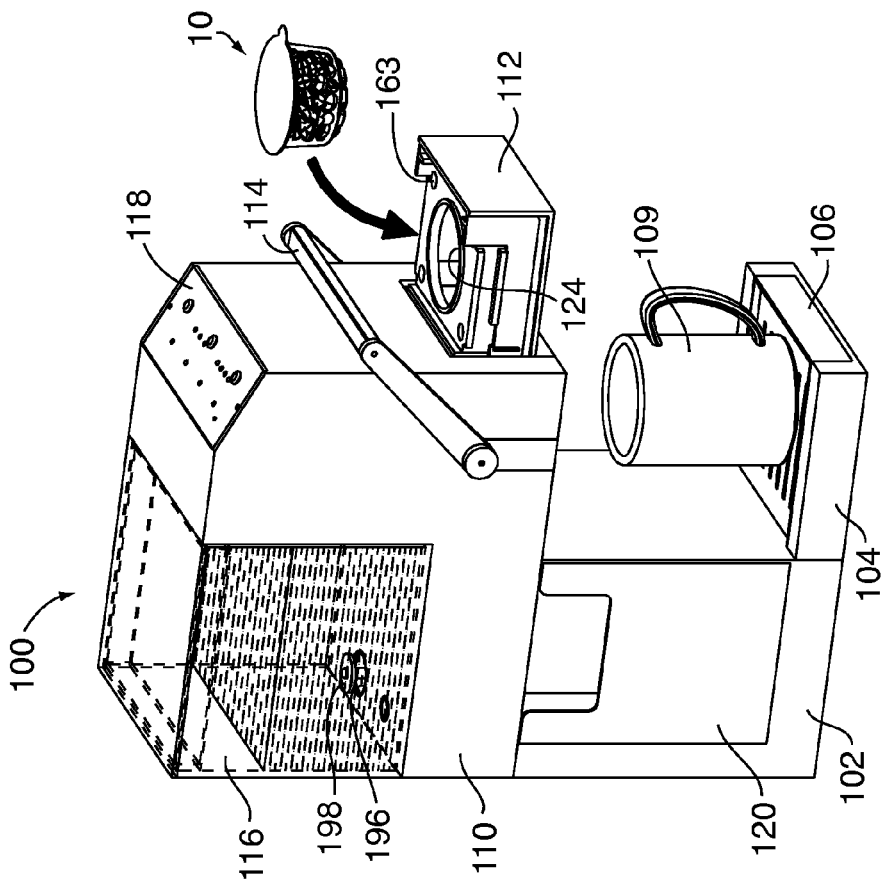
FIG. 18 is a perspective view of the coffee appliance of FIG. 9 illustrating the loading of the whole coffee bean pre-packaged filter cup of FIG. 1.
Figure 22:
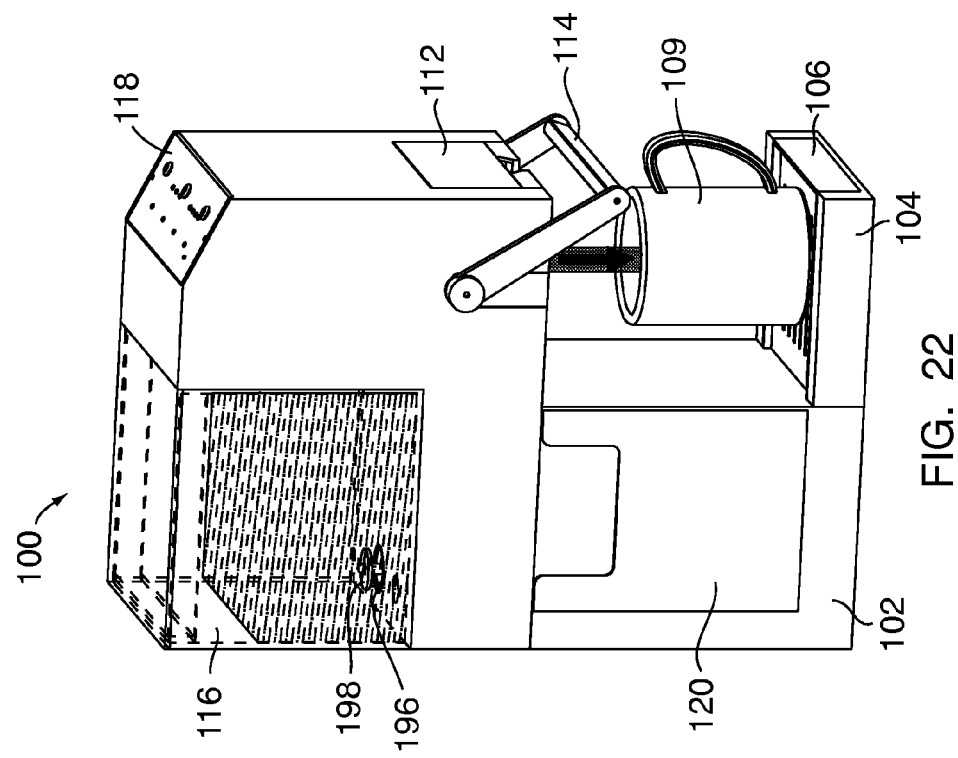
FIG. 22 is a perspective view of the coffee appliance of FIG. 9 during brewing/operation.
Figure 26:
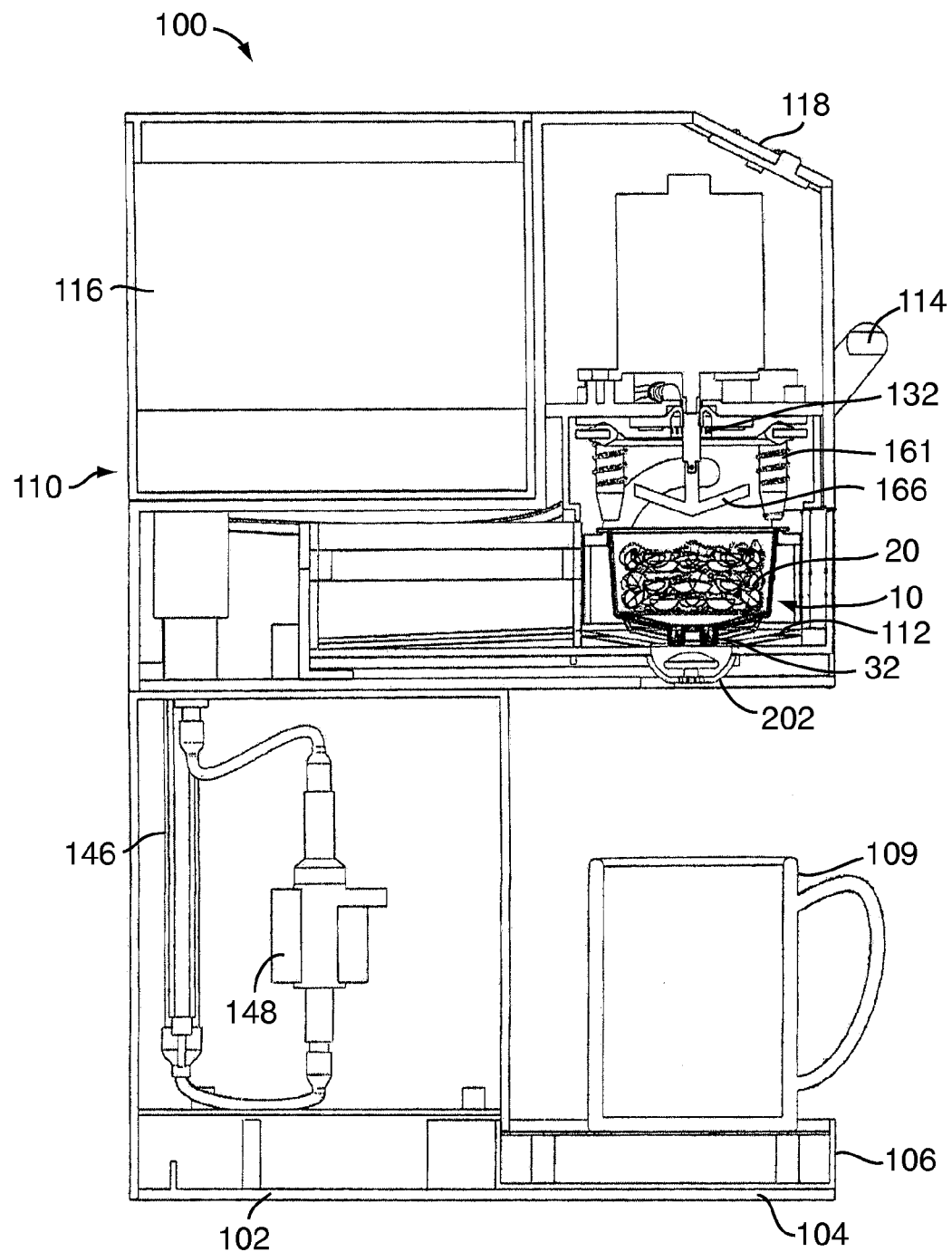
FIG. 26 is a first, side cross-sectional view of the coffee appliance of FIG. 9 in a first mode.
Figure 27:
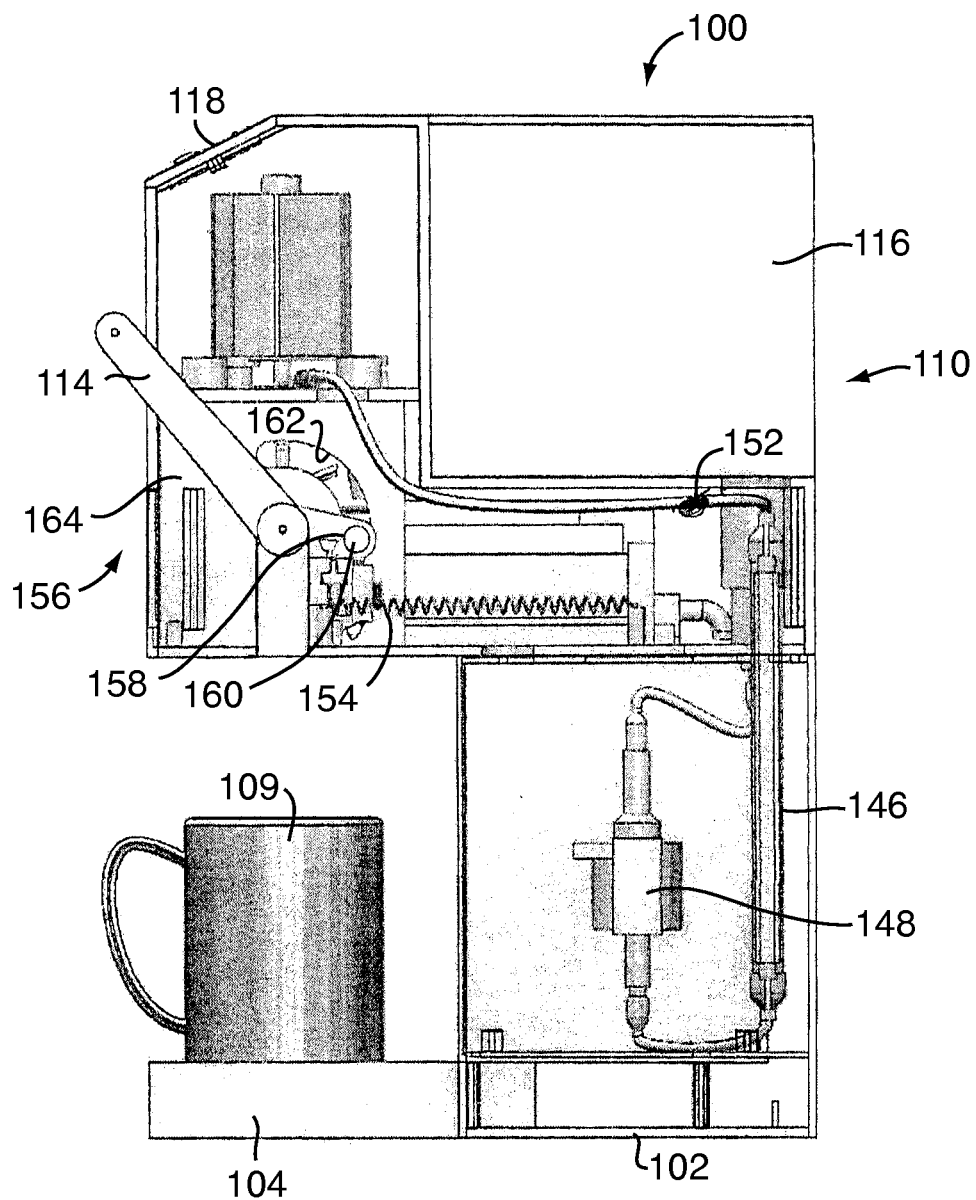
FIG. 27 is a second, side cross-sectional view of the coffee appliance of FIG. 9 in a first mode.

FIGS. 26 and 27 illustrate certain internal components of the appliance 100. As shown therein, the water reservoir 116 is filled with water. The tray 112 is withdrawn to permit placement of a cup 10 into a receiving bracket 124 in the tray 112, as shown in FIGS. 18 and 19. The tray 112 is then pushed back into the appliance to the position shown in FIG. 20. The handle 113 is then moved downwardly, as shown in FIGS. 21 and 22. Such movement of the handle 114 causes the cup 10 to be raised upwardly for grinding of the coffee beans 20 in the cup 10, as described below. The appliance 100 includes a heater 146 and pump 148 to heat water from the reservoir 116 and route it through a supply conduit to perform a brewing operation as described with reference to FIG. 25A. As shown in FIGS. 26-29, a grinder motor 150 is positioned in the housing 110 of the appliance 100 to carry out grinding of the coffee beans 20 in a manner described below. A hot water tube 152 carries heated water from the heater 146 to the water outlet 132 located above the tray 112.

Figure 29:
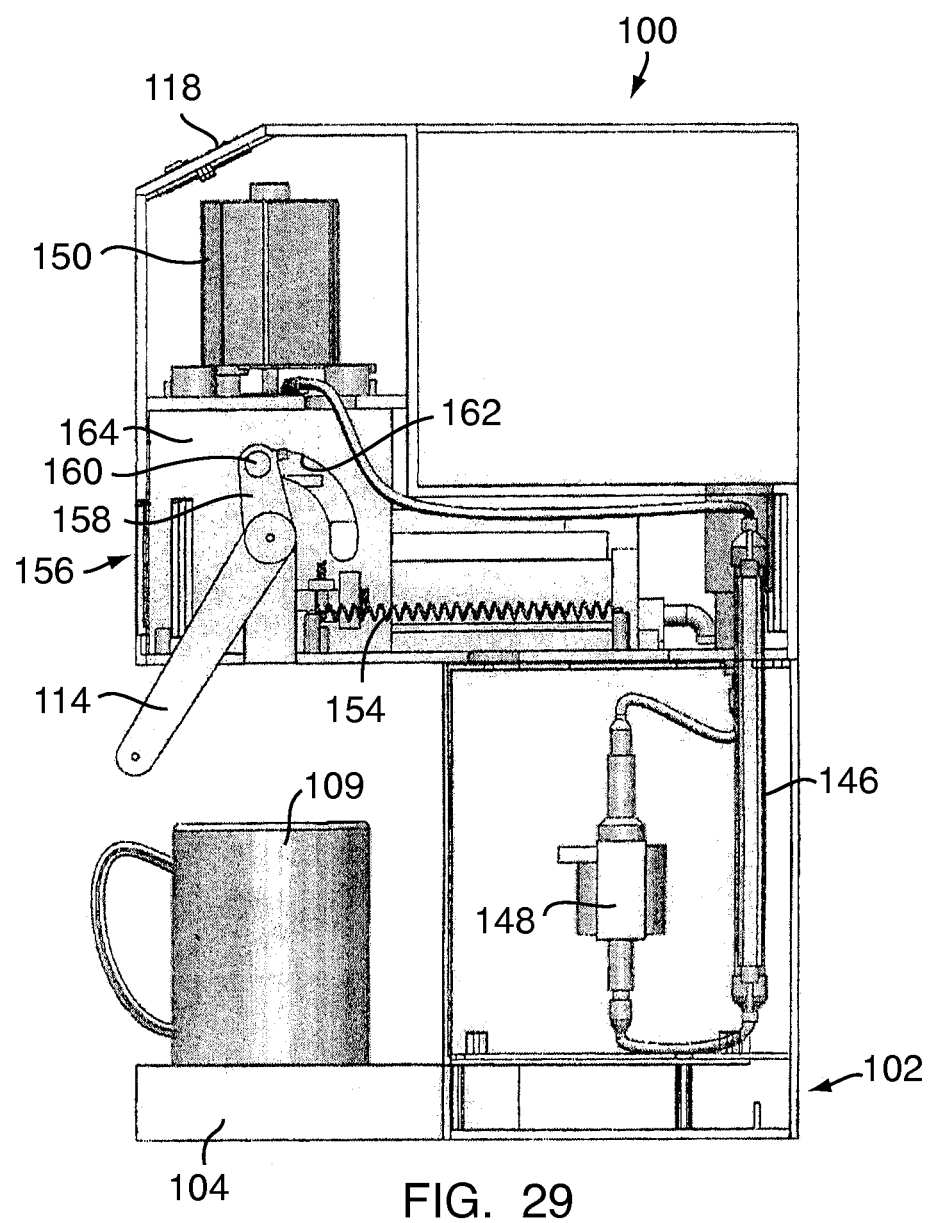
FIG. 29 is a second, side cross-sectional view of the coffee appliance of FIG. 9 shown in a second mode.

As best shown in FIGS. 27 and 29, lifting mechanism 156 is activated by the handle 114 in order to cause movement of the cup 10 between a lowered position and a raised position. The mechanism 156 includes a linkage arm 158, a pin 160 operatively attached to the receiving bracket 124 of the tray 112 and associated slot 162, and a plate 164 in which the slot 162 is located. In operation, upon moving the handle 114 in the downwards direction, pin 160 follows the path of the slot 162 and causes the cup 10 and the receiving bracket 124 to be lifted upwards into the grinding blade. Guideposts 161 are received in bore holes 163 of the receiving bracket to ensure proper orientation and alignment of the cup 10 with the grinding blade. Lowering of the cup 10 follows the reverse process.

Figure 28:
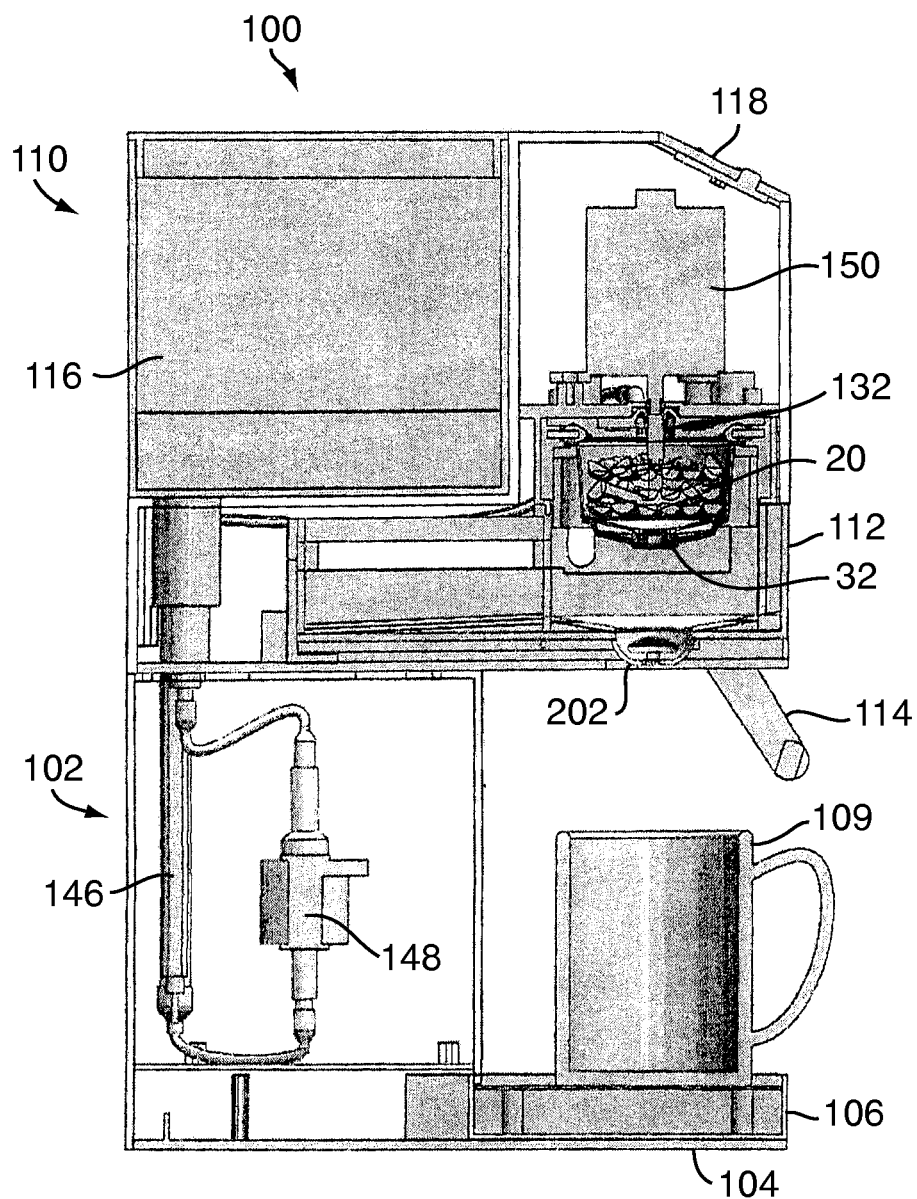
FIG. 28 is a first, side cross-sectional view of the coffee appliance of FIG. 9 shown in a second mode.
Figure 30:
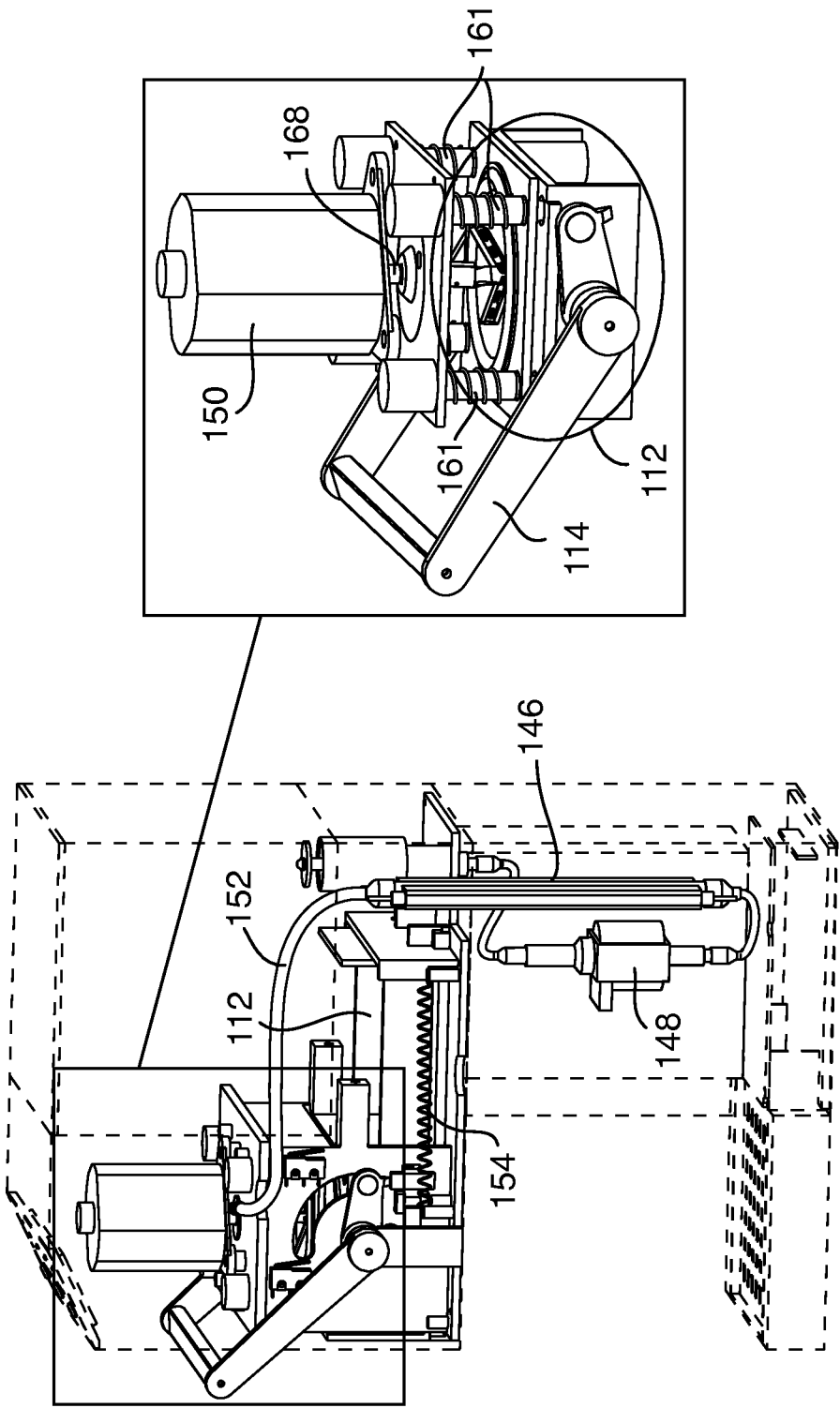
FIG. 30 is a detail schematic view of a grinding motor and grinding blade assembly of the coffee appliance of FIG. 9.

Referring to FIG. 30, the appliance 100 includes a grinding blade 166 attached to and driven by a rotary output shaft 168 associated with the grinder motor 150. When the handle 112 is moved to the lower position as shown in FIG. 28, the cup 10 is raised so that the blade 166 engages and pierces through the foil cover 18 and enters the cup 10 and comes into contact with the coffee beans 20. The cup loading/raising mechanism 156, which is activated by the handle 114, moves the cup 10 between this raised position for grinding, and a lowered position. The spring 154 is a user assist spring, which biases the tray 112 outwards from the housing 110 when then handle 114 is raised, in order to insert a cup 10.

Figure 34:
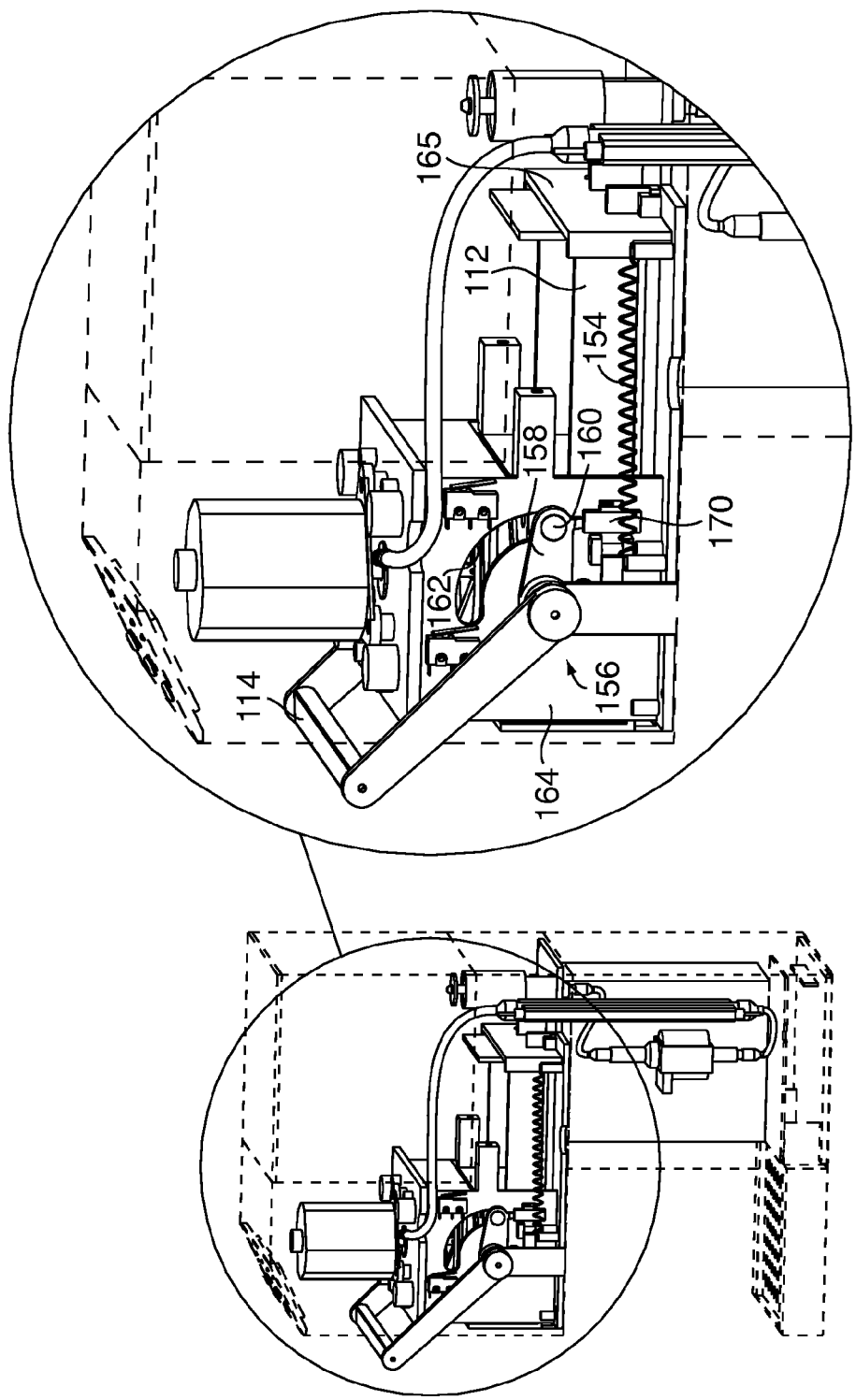
FIG. 34 is an enlarged, detail view of a filter cup lifting mechanism and grinding motor of the coffee appliance of FIG. 9.
Figure 38:
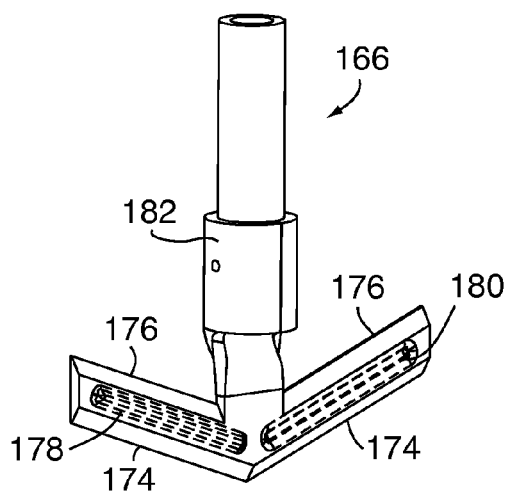
FIG. 38 is a perspective view of a grinding blade assembly for use with the coffee appliance of FIG. 9, in accordance with the present invention.
Figure 39:
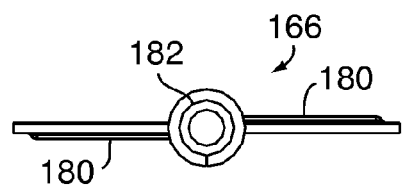
FIG. 39 is a top plan view of the grinding blade assembly of FIG. 38
Figure 40:
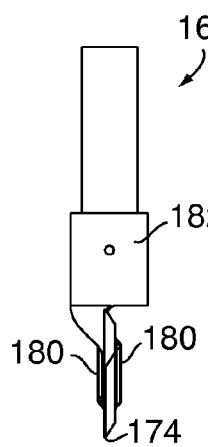
FIG. 40 is a left side elevational view of the grinding blade assembly of FIG. 38.
Figure 41:
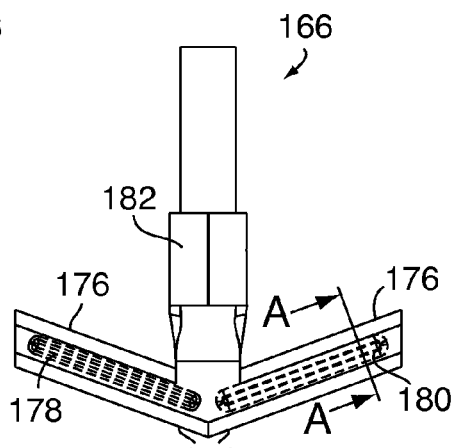
FIG. 41 is a front elevational view of the grinding blade assembly of FIG. 38.
Figure 42:
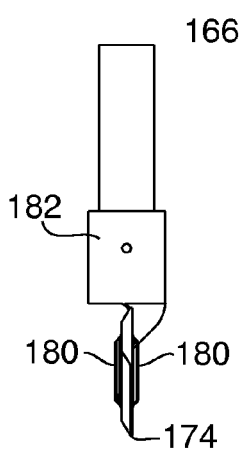
FIG. 42 is a right side elevational view of the grinding blade assembly of FIG. 38.
Figure 43:
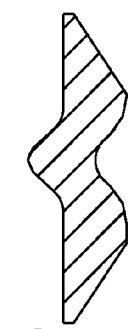
FIG. 43 is a side cross-sectional view of grinding blade assembly of FIG. 38, taken along line A-A of FIG. 41.

As shown in FIG. 31, movement of the handle 114 to the raised position unlocks the tray 112 so it slides out under force of the spring 154 in cooperation with a plate 165 (which serves as a anchoring object for the spring to work off of) in order to allow placement of a cup 10 into the receiving bracket 124 of the tray 112. A user then places a cup 10 into the tray 112 as shown in FIG. 32. The tray 112 must be manually pushed back into the closed position as shown in FIG. 33 until it locks in place by the tray lock 170 shown in FIG. 34.

FIGS. 35-37 illustrate the piercing and grinding sequence in accordance with the present invention. As shown in FIG. 35, the filter cup 10 is raised upwardly toward the blade 166, in the direction of arrow F when the handle 114 is lowered. FIG. 36 illustrates the position of the cup 10 when it is fully raised. In that position, a seal ring 172, such as an O-ring, engages a top rim of the cup 10 so that when the brewing process occurs the cup 10 may be pressurized. FIG. 37 illustrates the lowered position of the cup 10 after grinding and brewing occur and the handle 114 is raised. Importantly, the seal ring 172 seals the top of the cup 10 so that the cup may be pressurized. In the preferred embodiment, the cup is pressurized in excess of 200 kilopascals (2 bars) during brewing, although other pressures may be employed without departing from the broader aspects of the present invention.

Various views of the grinding blade 166 for grinding the whole coffee beans are shown in FIGS. 38-43. As shown therein, the blade 166 has a V-shaped configuration. Importantly, the blade 166 has insert cutting edges 174 so that the foil cover 18 of the cup 10 can be pierced when the cup 10 is raised upon downwards movement of the handle 114. The top of the blade also includes upward facing extract cutting edges 176 for cutting through the foil cover 18 when the cup 10 is lowered away from the blade subsequent to brewing, upon upwards movement of the handle 114. Each leg of the "V" is also formed with an opposed recess 178 and raised ridge 180 to facilitate grinding of the coffee beans 20, as described hereinafter. The blade 166 also includes a collar 182 for connection to the output shaft 168 of the grinding motor 150. In such an embodiment, the blade 166 may be removable for replacement and/or more thorough cleaning. In an alternative embodiment, the blade 166 is integrally formed or otherwise fixedly secured to the output shaft 168 of the motor 150. As will be readily appreciated, the slim profile of the blade 166 puts cuts a slot a minimal width in the foil cover 18 to prevent coffee grounds 128 from being thrown out of the cup 10 during grinding. In addition, the shape and configuration of the blade 166 facilitates cleaning.

Figure 44:
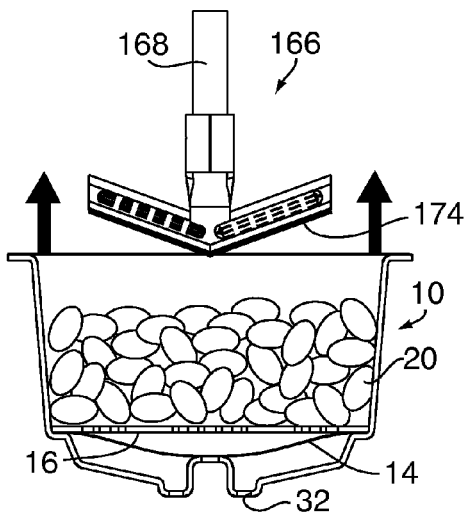
FIG. 44 is a schematic view of a blade assembly and the whole coffee bean pre-packaged filter cup of FIG. 1 shown in a first position.
Figure 45:
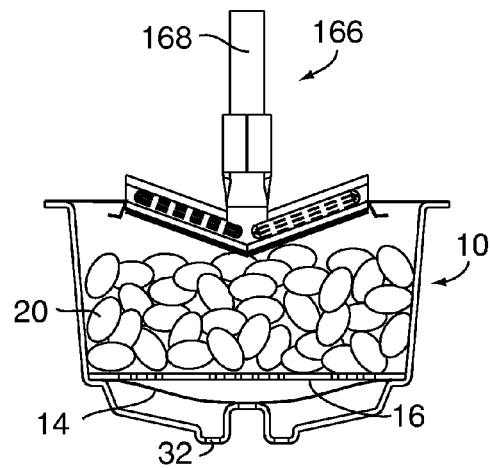
FIG. 45 is a schematic view of a blade assembly and the whole coffee bean pre-packaged filter cup of FIG. 1 shown in a second position.
Figure 46:
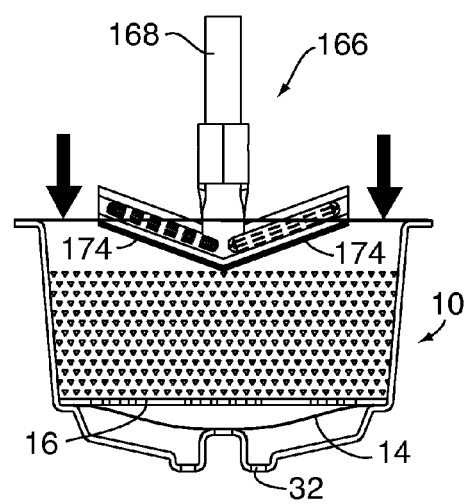
FIG. 46 is a schematic view of a blade assembly and the whole coffee bean pre-packaged filter cup of FIG. 1 shown in a third position.
Figure 47:
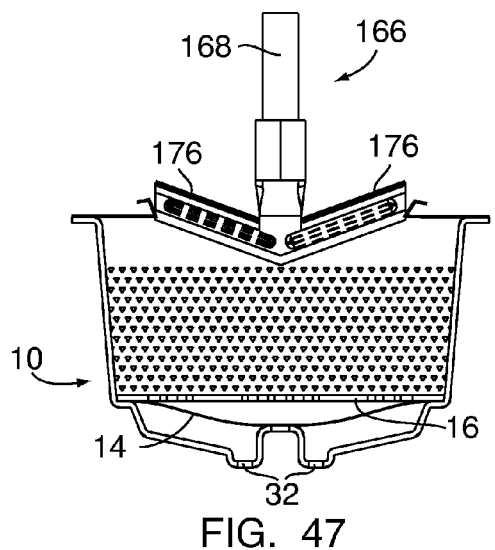
FIG. 47 is a schematic view of a blade assembly and the whole coffee bean pre-packaged filter cup of FIG. 1 shown in a fourth position.
Figure 52:
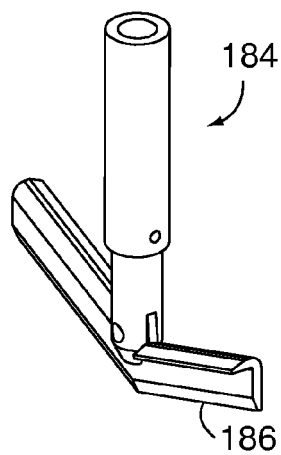
FIG. 52 is a perspective front view of an alternative grinding blade assembly for use with the coffee appliance of FIG. 9, in accordance with another embodiment present invention.
Figure 53:
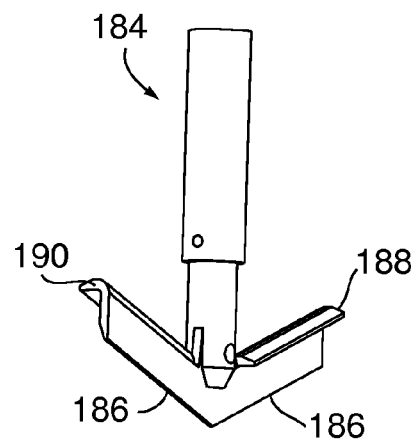
FIG. 53 is a perspective rear view of the alternative grinding blade assembly of FIG. 52.
Figure 54:
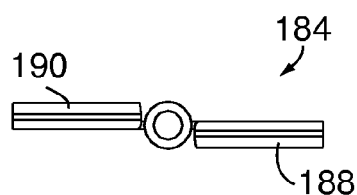
FIG. 54 is a top plan view of the alternative grinding blade assembly of FIG. 52.
Figure 55:
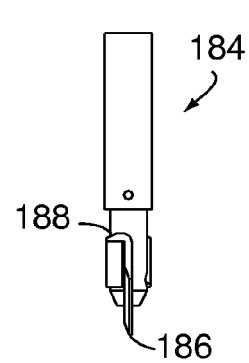
FIG. 55 is a left side elevational view of the alternative grinding blade assembly of FIG. 52.
Figure 56:
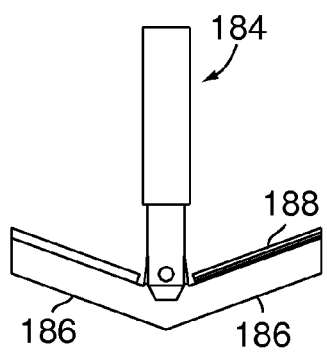
FIG. 56 is a front elevational view of the grinding blade assembly of FIG. 52.
Figure 57:
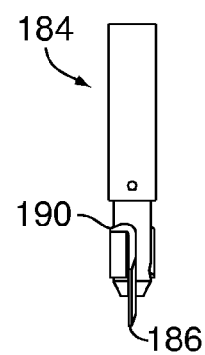
FIG. 57 is a right side elevational view of the grinding blade assembly of FIG. 52.

FIG. 44 illustrates the cup 10 being raised toward the blade 166 and FIG. 45 illustrates the blade 166, by way of the insert cutting edges 174, piercing the foil cover 18 of the cup 10. In both FIGS. 44 and 45 the coffee beans 20 in the cup 10 are not yet ground. After grinding, the beans 20 have been transformed into ground coffee 128. Brewing occurs, as described above, and the cup 10 is then lowered as shown in FIGS. 46 and 47 such that the extract cutting edges 176 of the blade 166 again pierce the foil cover 18, if necessary, to facilitate removal of the cup 10 from the blade 166.

Figure 60:
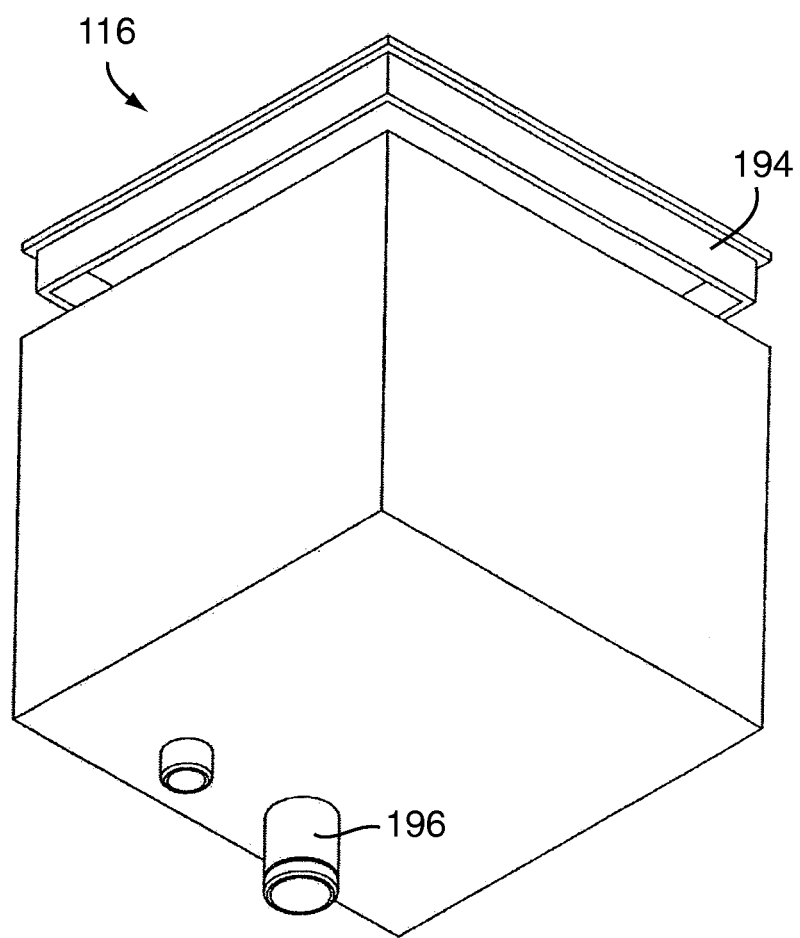
FIG. 60 is a perspective view of a water reservoir of the coffee appliance according to the present invention.
Figure 61:
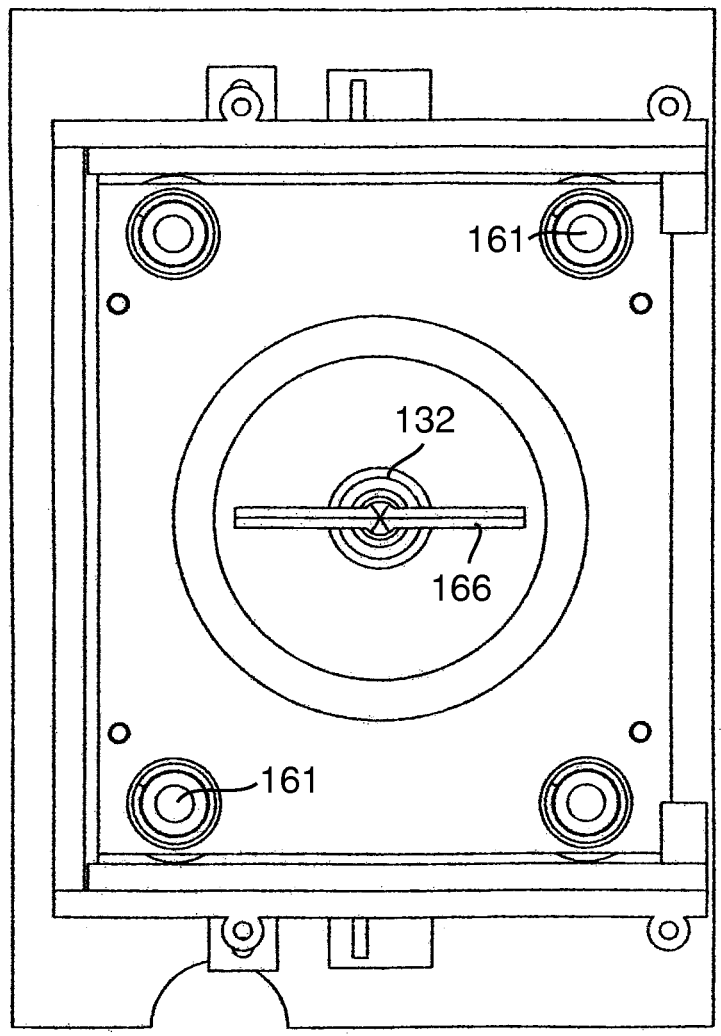
FIG. 61 is a bottom plan view of a portion of the coffee appliance of FIG. 9

Referring now to FIGS. 48-50, the actual grinding process is illustrated. Upon actuation of the grinding motor 150, the grinding blade 166 rotates at a high frequency sufficient to grind the coffee beans 20 in the filter cup 20 to transform the coffee beans 20 from whole beans, as shown in FIG. 48, to grinds, as shown in FIG. 60. In particular, the blade 166 is rotated in a direction (see FIG. 49) that causes the ridge 180 on the blade 166 to strike/impact the coffee beans 20 to cause them to split. Over time, numerous impacts from the blade itself, and most importantly, by the ridges 180, gradually reduce the size of the coffee beans to fine grounds sufficient for brewing. In an embodiment, the blade 166 may continue to rotate at a predetermined frequency during the brewing process, i.e., during the time during which hot water is passed through the cup 12. The frequency of rotation during brewing may be the same as, or different from, the frequency utilized to grind the coffee beans 20. In other embodiments, the blade 166 may be utilized to stir drink ingredients during brewing, such as to facilitate dissolution of drink ingredients into the water passing through the cup 10 (e.g., when utilizing iced tea drink ingredients in place of whole coffee beans). As will be readily appreciated, stirring the drink ingredients/coffee beans within the cup 10 while brewing may produce a better tasting beverage. In particular, stirring during brewing may improve the contact between the coffee grounds 128 and the hot water, which may improve coffee quality and/or concentration.

In an alternative embodiment, the filter cup 10 may be retracted from the grinding blade 166 prior to distributing heated water to the cup 10. As will be readily appreciated, this ensures that the grinding blade 166 only touches the coffee when it is dry (i.e., when it grinds the coffee beans 20 prior to brewing). Accordingly, grounds coffee is not as susceptible to sticking to the blade 166 as it would be if the blade 166 and ground coffee 128 were present together in a wet environment and, as such, keeps the blade substantially free of coffee grounds without having to clean the blade.

FIGS. 52-57 illustrate an alternative configuration for a grinding blade 184 that may be utilized with the appliance 100. As shown therein, the blade has a V-shaped configuration and has a piercing edge 186 for piercing the foil cover 18 of the cup 10. The blade 184 also has two horizontally extending flanges 188, 190 to facilitate grinding of the coffee beans 20 and two upward edges 192, 194 for again cutting through the foil 18 when the cup 10 is lowered away from the blade 184. As with the blade 166 of the preferred embodiment, the blade 184 may be releasably attached to the output shaft 168 of the grinding motor 150, or it may be integrally formed or otherwise permanently affixed thereto.

Figure 58:
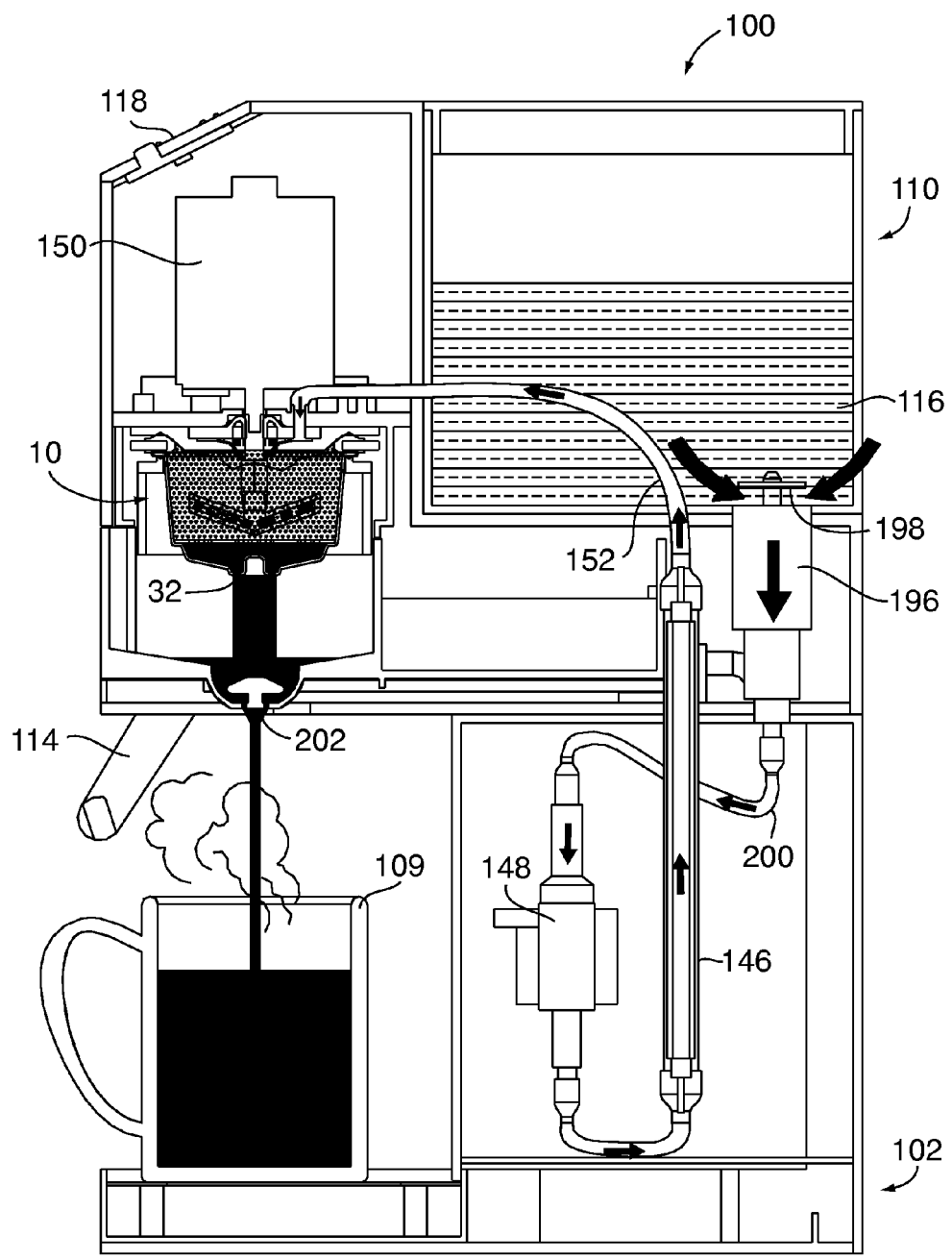
FIG. 58 is a schematic, cross-sectional view of the coffee appliance of FIG. 9 illustrating a flow of water from a reservoir through the pre-packaged filter cup of FIG. 1.

The path of water used in the process of the present invention is illustrated in FIG. 58. First, the reservoir 116 is filled with water. In an embodiment, the reservoir 116 may be releasably received on the housing 110 such that a user can remove the reservoir 116 to fill it with water and then place it on the housing 110. As will be readily appreciated, such a configuration may be easier than bring a water source to the reservoir itself. The reservoir 116 may have a removable lid 194 as shown in FIG. 60 to facilitate filling with water. A water outlet 196, best shown in FIGS. 17-24, permits water to flow from the reservoir 116 under the force of gravity. The outlet 196 may be equipped with a valve 198 of a type commonly known to those skilled in the art, wherein the valve my be electronically activated and controlled by means of a conventional controller from an open position to a closed position, and vice versa. During brewing, water exits the reservoir 116 through the outlet 196 and travels through a first tube 200 until it reaches the pump 148. The pump 148 pumps the water through the heater 146 in order to heat the water to a desired, predetermined temperature. The water passes from the heater 146 through the hot water supply tube 152 to the water outlet 132.

In an embodiment, at the end of the brewing process, the flow of water will be shut off prior than the heater such that steam will be generated to push or blow out excess liquid remaining in the cup 10. As will be readily appreciated, this steam blast ensures that the last few drops of coffee do not remain in the cup 10 and prevents dripping.

Figure 25B:
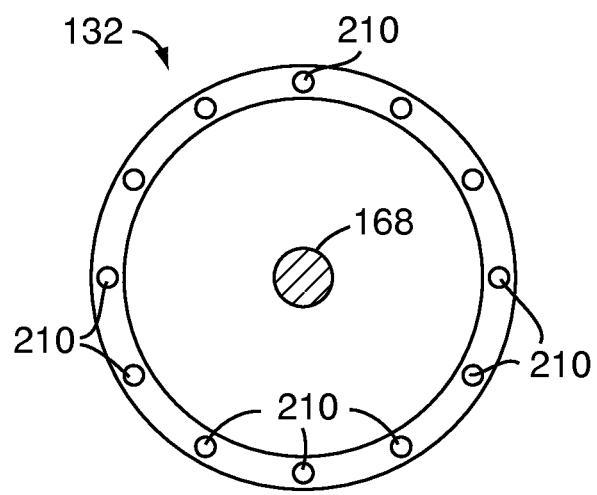
FIG. 25B is a bottom plan view of a shower head for distributing heated water to the whole coffee bean pre-packaged filter cup of FIG. 1 in accordance with the present invention.

As shown in FIG. 25B, in an embodiment, the water outlet 132 is a shower head in the form of an annular tube or ring 208 having a plurality of apertures 210 formed therein for distributing heated water. Heated water emitted from the apertures 210 of the shower head 132 is used both for brewing coffee and for rinsing the blade 166 in the cleaning operation. During brewing the heated water leaving the water outlet/shower head 132 enters the cup 10 which, at this point in the process, contains ground coffee 128. The water, now brewed coffee, exits the cup 10 through the apertures 32 in the floor 26 of the cup 10. As it exits the cup through the apertures 32, it travels down through an exit conduit in the tray 112 before emitting through the tray exit 202. In an embodiment, the tray may include a flow softening member 204 directly below the apertures 32 of the filter cup 10. The flow softening member retards the direct flow of brewed coffee into the coffee mug 109 so that the brewed coffee doesn't gush out and splash a user or create a mess. After leaving the exit 202, the water, which has now become brewed coffee, falls into the coffee mug 109. The volume of liquid selected, corresponding to the serving size, is pre-selected using the controls 118, and the pump 148 and water outlet 196 are accordingly controlled to permit flow of only the selected amount before shutting off flow.

FIGS. 65-67 illustrate an alternative configuration of the drip tray 106 in accordance with another embodiment of the present invention. As shown therein, the drip tray is moveable between a first position, as shown in FIG. 66, in which the tray 106 is positioned below the brewed coffee exit 202, and a second position, as shown in FIG. 7, in which the drip tray 106 is housed within the base 102 of the appliance 100. With the drip tray 106 in the position shown in FIG. 67, taller cups/mugs 206 may be accommodated.

Figure 68:
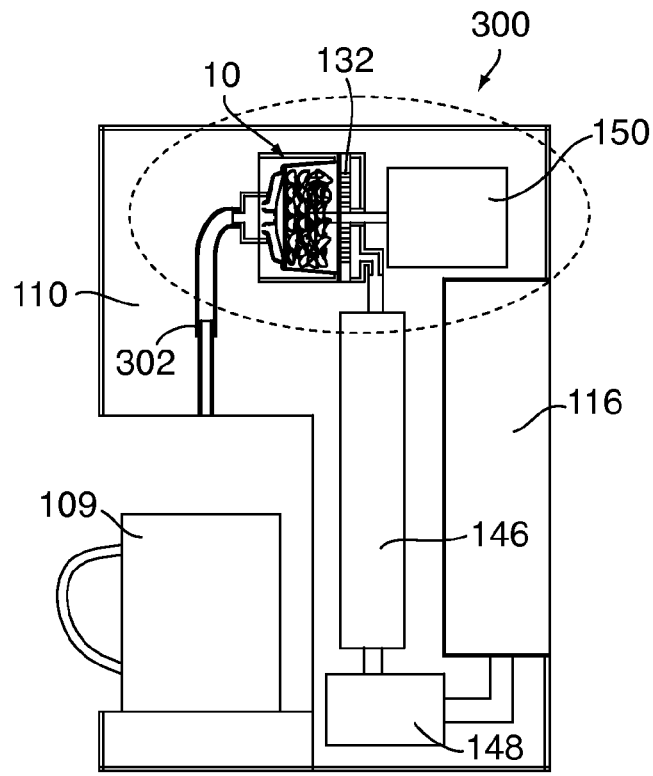
FIG. 68 is a schematic view of a coffee appliance according to another embodiment of the present invention.

FIG. 68 illustrates a coffee appliance 300 having an alternative configuration in accordance with one embodiment of the present invention. As shown therein, instead of the cup 10 being installed vertically and the grinding blade 166, brew shower head 132 and motor 150 being in a vertical position above the cup 10, these elements are oriented horizontally. In particular, as shown therein, the filter cup 10 is installed in a horizontal orientation within the housing 110. In addition, the grinding motor 150, shower head 132 and blade 166 are positioned to the side of the cup 10 in a horizontal position. In this embodiment, the appliance 300 includes a conduit 302 in communication with the bottom of the cup 10 such that brewed coffee exits the cup and is routed through the conduit 302 to the outlet 202 for distribution into a user's cup 109.

Figures 69, 70:
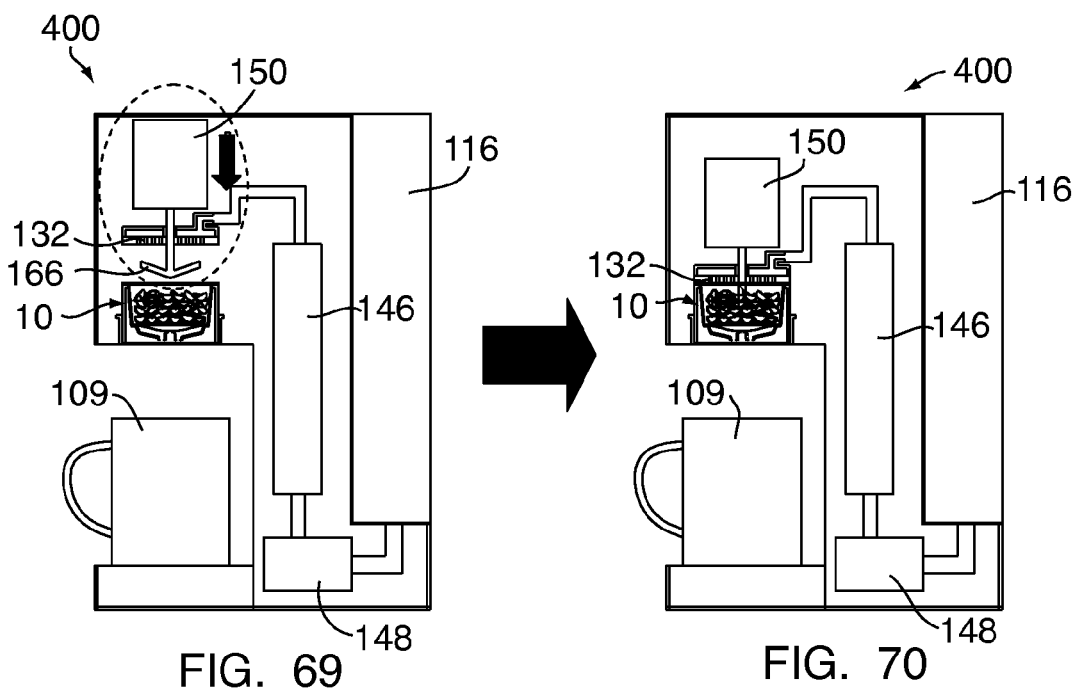
FIG. 69 is a schematic view of a coffee appliance in accordance with another embodiment of the present invention, illustrating a grinding motor in a first position.
FIG. 70 is a schematic view of the coffee appliance of FIG. 69 illustrating the grinding motor in a second position.

FIGS. 69 and 70 illustrate a coffee appliance 400 according to yet another embodiment of the present invention. The coffee appliance 400 is similar in configuration to that of the appliance 100 disclosed above, with a few notable differences. As shown therein, instead of the motor 150, blade 166 and shower head 132 being stationary and the cup 10 being lifted into engagement with the blade 166, in this embodiment, the brew shower head 132, motor 150 and blade 166 are configured to move towards and away from a stationary cup 10. FIG. 69 illustrates a first position of the motor 150, blade 166 and brew head 132 above the stationary filter cup 10. The motor 150, blade 166 and brew head 132 are moveable in the vertical direction to a second position, shown in FIG. 70, in which the blade is disposed within the cup 10. The vertical movement of the motor 150, blade 166 and shower head 132 may be effectuated by utilizing mechanical action or electrical actuators. The coffee appliance 400 according to this embodiment may be characterized as having an active brew assembly (motor 150, grinding blade 166 and shower head 132) and a passive filter cup 10, as opposed to an active filter cup 10 and passive brew assembly.

While the preferred embodiment contemplates the grinding and brewing of coffee from whole coffee beans, the present invention is not intended to be limited in this regard. In particular, it is contemplated that the present invention apparatus and method are not limited to cups containing whole bean coffee, per se, and the invention may be used with cups containing ground coffee, partially ground coffee, tea leaves, ground tea, or drink mix ingredients. In addition, the appliance according to the embodiments of the present invention can make/brew beverages from any ingredients contained within the filter cup, and is not limited to brewing coffee from whole coffee beans.

FIGS. 71 and 72 illustrate a dual serving coffee appliance 500 in accordance with yet another embodiment of the present invention. The dual serving coffee appliance 500 is substantially similar to, and operates in substantially the same manner as, the coffee appliance 100 disclosed above. As shown in FIGS. 71 and 72, the coffee appliance 500 includes a housing 502, a base 504, and filter cup tray 506 slidably received in the housing 502 and dimensioned to closely receive a filter cup, such as filter cup 10, containing at least one drink ingredient. The drink ingredient may be whole coffee beans. A grinding motor 508 is positioned in the housing 502 about the filter cup tray 506 and includes a blade assembly 510 for grinding the coffee beans, in the manner disclosed hereinbefore. In particular, the tray 506 may be moved towards the blade assembly 510 such that a cover of the filter cup is pierced by the blade 510 and the blade 510 enters the cup. Alternatively, the motor 508 and blade 510 may be moved towards the cup such that the cover is pierced by the blade 510 and the blade 510 enters the cup. In any event, once the blade 510 is positioned within the cup, the motor 508 is actuated, causing the blade 510 to rotate at a predetermined frequency, thereby grinding the whole coffee beans or otherwise mixing the drink ingredients within the cup.

As further shown in FIGS. 71 and 72 the coffee appliance 500 includes a water reservoir 512, a pump 514 and a heater/boiler 516. After the coffee beans are ground within the cup, water is pumped from the water reservoir 512 through the heater 516, which heats the water to a predetermined temperature. The water then continues from the heater 516, through a supply conduit 518 and to a shower head 520 positioned above the filter cup and tray 506 from which it is passed through the filter cup to produce brewed coffee.

Importantly, as shown therein, the filter cup tray 506 includes two exit apertures at the bottom thereof, a first exit aperture 522, and a second exit aperture 524 spaced from the first exit aperture 522. FIG. 71 illustrates the dual serving coffee appliance 500 in a single serving mode. As shown therein, a single coffee cup 526 is placed on the base 504 directly beneath the two exit apertures 522, 524 in the tray 506. A user then selects or depresses a single serving button on a control panel (not shown). The coffee appliance 500 then brews a predetermined single-serve volume of coffee, and dispenses the brewed coffee from the two exit apertures 522, 524.

FIG. 72 illustrates the dual serving coffee appliance 500 in a dual serving mode. As shown therein, two coffee cups 526 are placed on the base 504 such that one cup 526 is below the first exit aperture 522 and the other cup 526 is below the second exit aperture 524. A user then depresses a two-serving button on the control panel and the appliance 500 then brews a two-serving volume of coffee. The coffee is dispensed equally out of the first and second exit apertures 522, 524 to fill the two coffee cups 526. As will be readily appreciated, the dual serving coffee appliance 500 is capable of delivering two cups of coffee simultaneously. This ensures that the coffee in each cup is substantially the same temperature and is ready at the same time. This is possible because the two outlet apertures 522, 524 are positioned substantially the same distance from the apertures 32 of the filter cup 10, and the apertures 522, 524 have substantially similar or dimensions.

Figure 74:
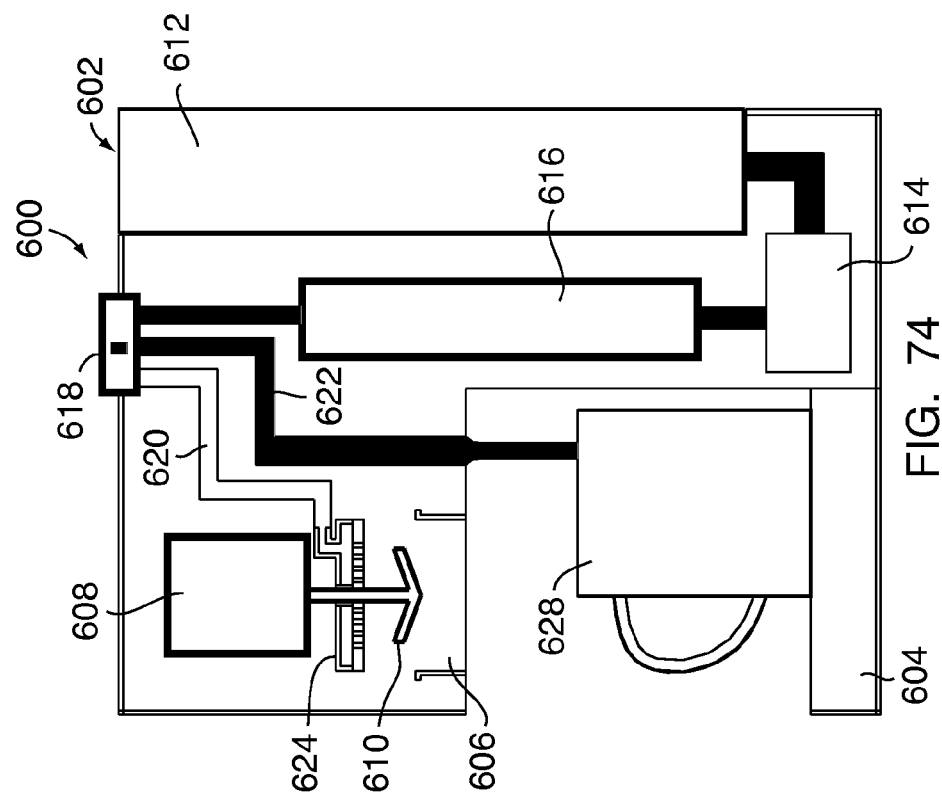
FIG. 74 is a schematic view of the beverage appliance of FIG. 73 illustrating a second operating mode.
Figure 73:
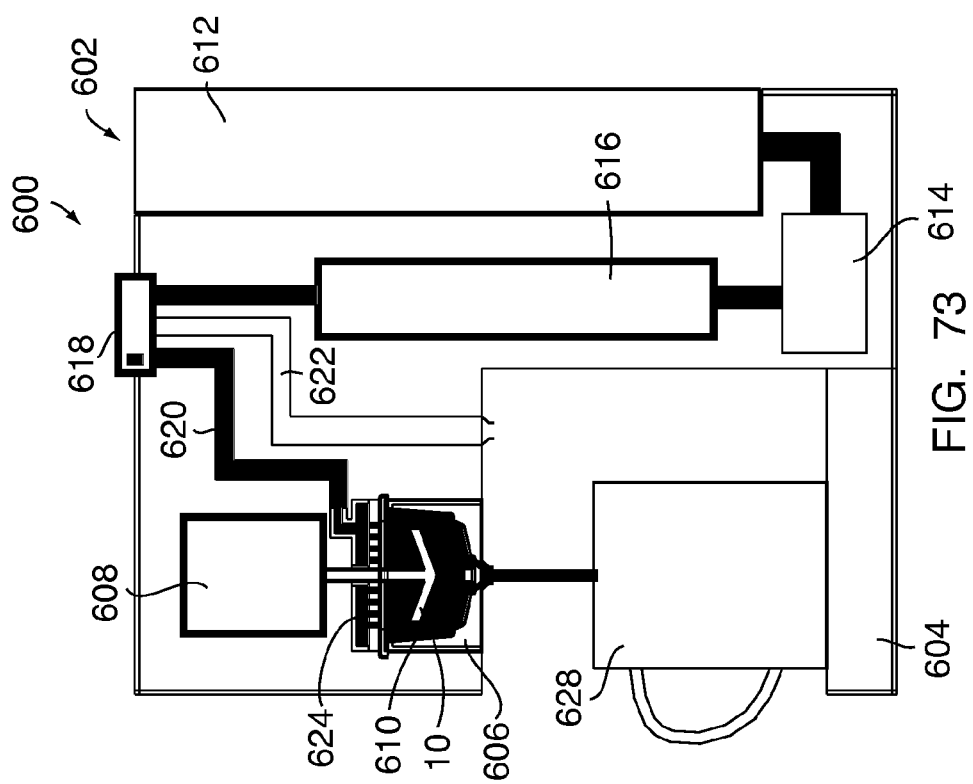
FIG. 73 is a schematic view of beverage appliance in accordance with another embodiment of the present invention illustrating a first operating mode.

Referring now to FIGS. 73 and 74, a beverage appliance 600 according to yet another embodiment of the present invention is shown. The beverage appliance 600 includes a housing 602, a base 604, and filter cup tray 606 slidably received in the housing 602 and dimensioned to closely receive a filter cup, such as filter cup 10, containing at least one drink ingredient. The drink ingredient may be whole coffee beans. A grinding motor 608 is positioned in the housing 602 about the filter cup tray 606 and includes a blade assembly 610 for grinding the coffee beans, in the manner disclosed hereinbefore. In particular, the tray 606 may be moved towards the blade assembly 610 such that a cover of the filter cup is pierced by the blade 610 and the blade 610 enters the cup. Alternatively, the motor 608 and blade 610 may be moved towards the cup such that the cover is pierced by the blade 610 and the blade 610 enters the cup. In any event, once the blade 610 is positioned within the cup, the motor 608 is actuated, causing the blade 610 to rotate at a predetermined frequency, thereby grinding the whole coffee beans or otherwise mixing the drink ingredients within the cup.

As further shown in FIGS. 73 and 74 the beverage appliance 600 includes a water reservoir 612, a pump 614 and a heater/boiler 616. An output of the heater 616 is in fluid communication with a water path selector 618 which is configured to selectively distribute water to a brew supply conduit 620 or a hot water tube 622 in dependence upon a button/mode selected by a user on a control panel (not shown). The brew supply conduit 620 is in fluid communication with a shower head 624 positioned above the filter cup tray 606 and configured to dispense hot water into the filter cup. The water path selector 618 may be a valve that has a single input and two outputs.

FIG. 73 illustrates the beverage appliance 600 in a brewing mode, as selected by a user by depressing a "brew mode" button on a control panel (not shown). As shown therein, a filter cup is received in the filter cup tray 606. The filter cup 10 is inserted into the housing directly under the grinding blade 610 and motor 608. After grinding the whole coffee beans within the filter cup 10, water is pumped from the water reservoir 612 through the heater 616, which heats the water to a predetermined temperature. The water then continues from the heater 616 to the water path selector 618, where it is then routed to the brew supply conduit 620. The hot water is then distributed by the shower head 624 through the filter cup 10 to brew coffee. The brewed coffee then exits the filter cup 10 through the apertures in the bottom thereof, and ultimately exits the filter cup tray 606 through a brewing outlet 626 in the bottom thereof. The brewed coffee then collets in a coffee cup 628 positioned beneath the brewing outlet 626 on the appliance base 604.

FIG. 74 illustrates the beverage appliance 600 in a hot water dispensing mode. In operation, a user selects a "hot water only" option from the control panel on the appliance 600 and places a cup 628 directly under a hot water outlet 630. Water is then pumped from the water reservoir 612, through the heater 616, which heats the water to a predetermined temperature. The heated water then continues from the heater 616 to the water path selector 618, where it is then routed to the hot water tube 622 and directly out the hot water outlet 630.

As will be readily appreciated, the beverage appliance 600 permits a user to either brew a cup of coffee, or dispense hot water only. Importantly, these two functions are physically separated by means of the water path selector 618. This physical separation ensures that the hot water dispensing is clean and is not contaminated by coffee. In particular, this configuration ensures that coffee will not be dispensed into a users cup during "hot water only" mode, nor will the hot water have an underlying coffee flavor or smell contamination.

Figure 75:
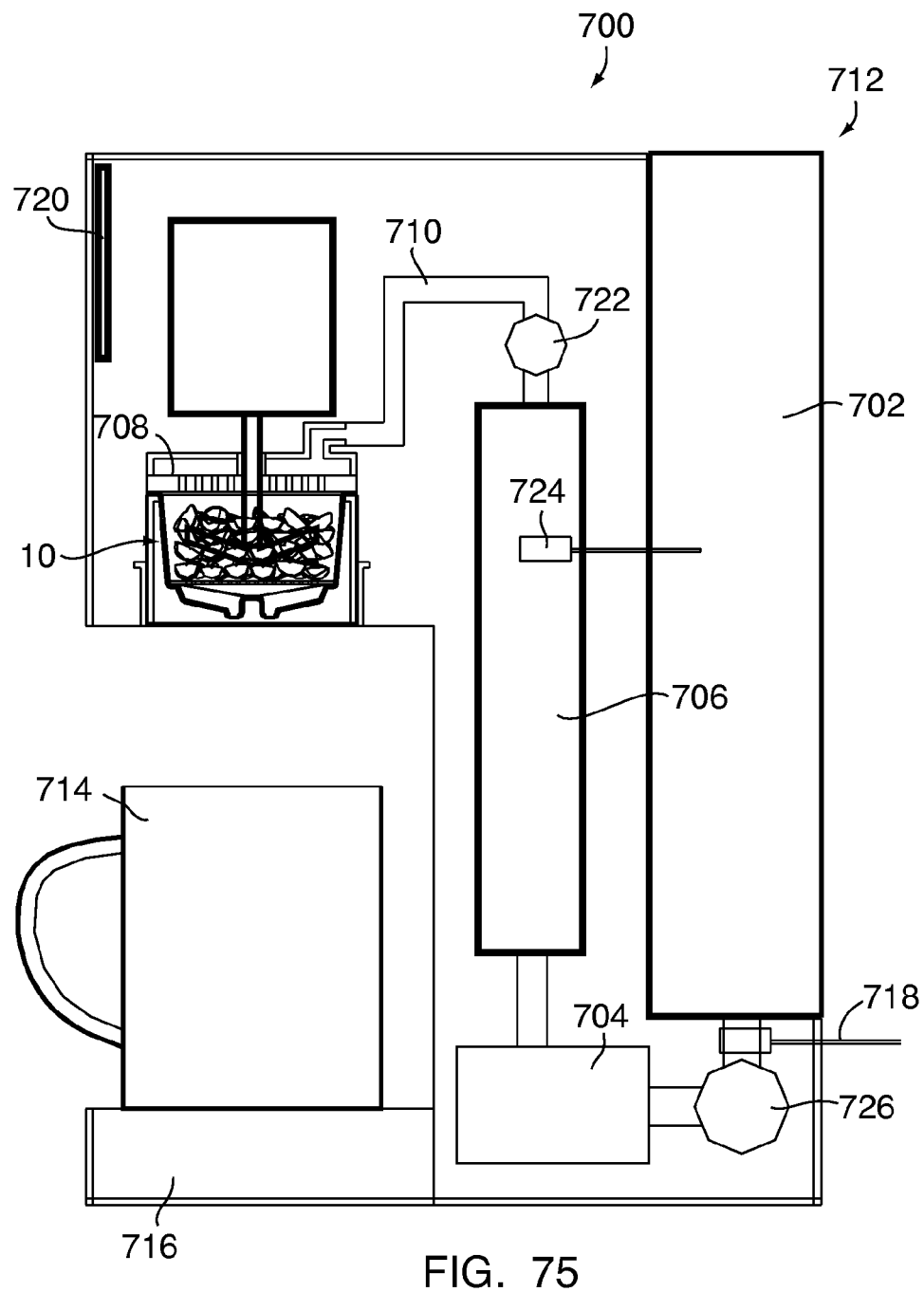
FIG. 75 is a schematic view of a beverage appliance having a temperature control system in accordance with another embodiment of the present invention.
Figure 76:
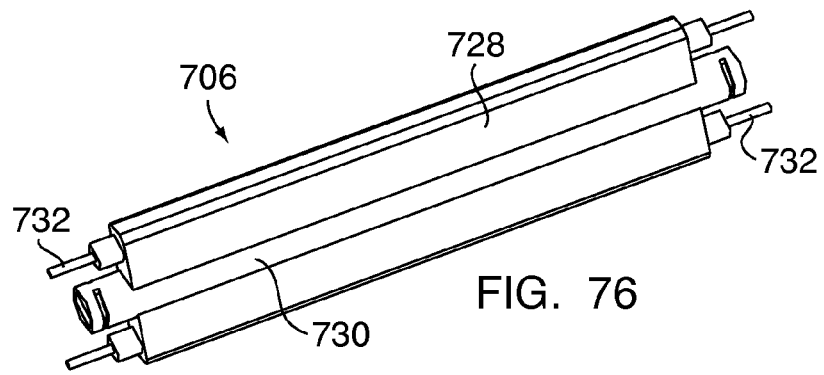
FIG. 76 is a perspective view of a boiler for use with the beverage appliance of FIG. 75.
Figure 77:
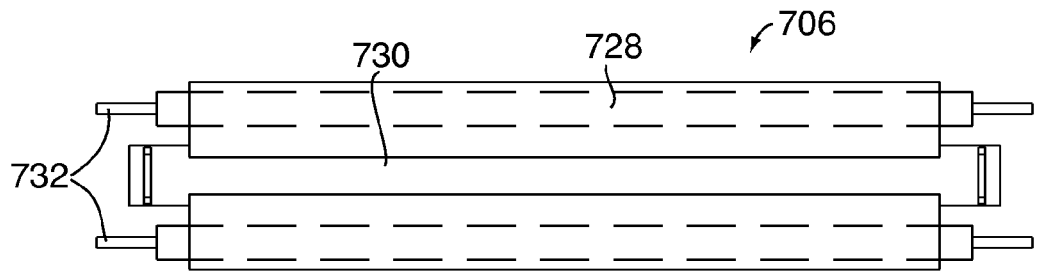
FIG. 77 is a side elevational view of the boiler of FIG. 76.
Figure 78:
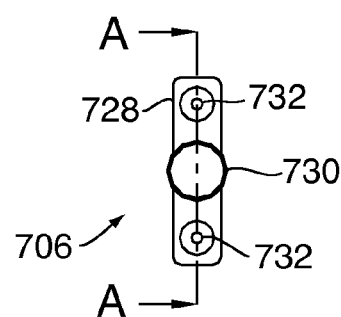
FIG. 78 is an end elevational view of the boiler of FIG. 76.
Figure 79:
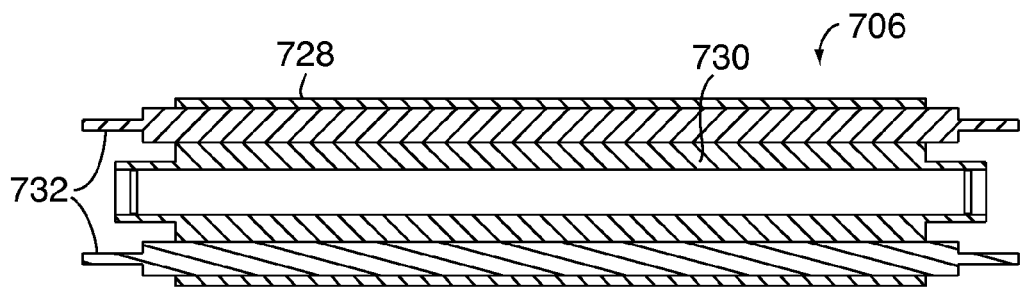
FIG. 79 is a side cross-sectional view of the boiler of 76, taken along line A-A of FIG. 78.

Another embodiment of the present invention relates to a water heating system and temperature control method for a beverage apparatus such as a coffee maker. As shown in FIG. 75, a beverage apparatus 700 having a water heating and temperature control system includes a water reservoir 702, a pump 704 and a boiler/heater 706. As with the embodiments disclosed above, the pump 704 pumps water from the water reservoir 702, through the heater 706 (where the water is heated to a predetermined temperature), and to a shower head 708 through a supply conduit 710. The shower head 708 is positioned over a filter cup 10 received in the housing 712 of the appliance and dispenses the heated water into the cup 10 to produce brewed coffee (or other drink) for distribution into a user's cup 714 positioned on a base 716 of the appliance 700.

As further shown therein, the appliance 700 includes a water inlet sensor 718 positioned in the conduit connecting the water reservoir 702 to the heater 706. The water inlet sensor 718 is electrically connected to a controller within the appliance 700 (and having a printed circuit board 720) and measures the water temperature prior to entering the heater 706. The water inlet sensor 718 relays the detected temperature to the controller. The appliance 700 also includes a water outlet sensor 722 positioned downstream from the heater 706 which measures the water temperature leaving the heater 706. The outlet sensor 722 is also electrically connected to the controller for relaying the detected temperature. The heater 706 itself is also configured with a heater sensor 724 for measuring the temperature of the heater 706. As with the outlet sensor 722 and inlet sensor 718, the heater sensor 724 is electrically connected to the controller for relaying the detected temperature thereto. As shown therein, the appliance 700 further includes a flow meter 726 positioned adjacent the outlet of the water reservoir 702 that measures the flow of water exiting the reservoir 702. In particular, in an embodiment, the flow meter 726 measures the rate of flow of water exiting the reservoir 702 and relays this information to the controller.

Referring now to FIGS. 76-79, detail views of the heater/boiler 706 are shown. As shown therein, the heater 706 includes an extruded aluminum shell 728 surrounding a generally cylindrical water channel 730. Two heaters, such as Bundy heaters 732 are positioned within the extruded aluminum shell 728 adjacent the water channel 730. In operation, the heaters 732 heat up the extruded aluminum shell 728 and the aluminum walls of the water channel 730 to thereby heat the water passing therethrough. As will be readily appreciated, the construction of the heater/boiler 706 from extruded aluminum results in a very lightweight heater. Accordingly, the heater 706 is capable of heating up to desired temperatures very quickly, thus obviating the need in certain instances for preheating prior to brewing.

Figure 80:
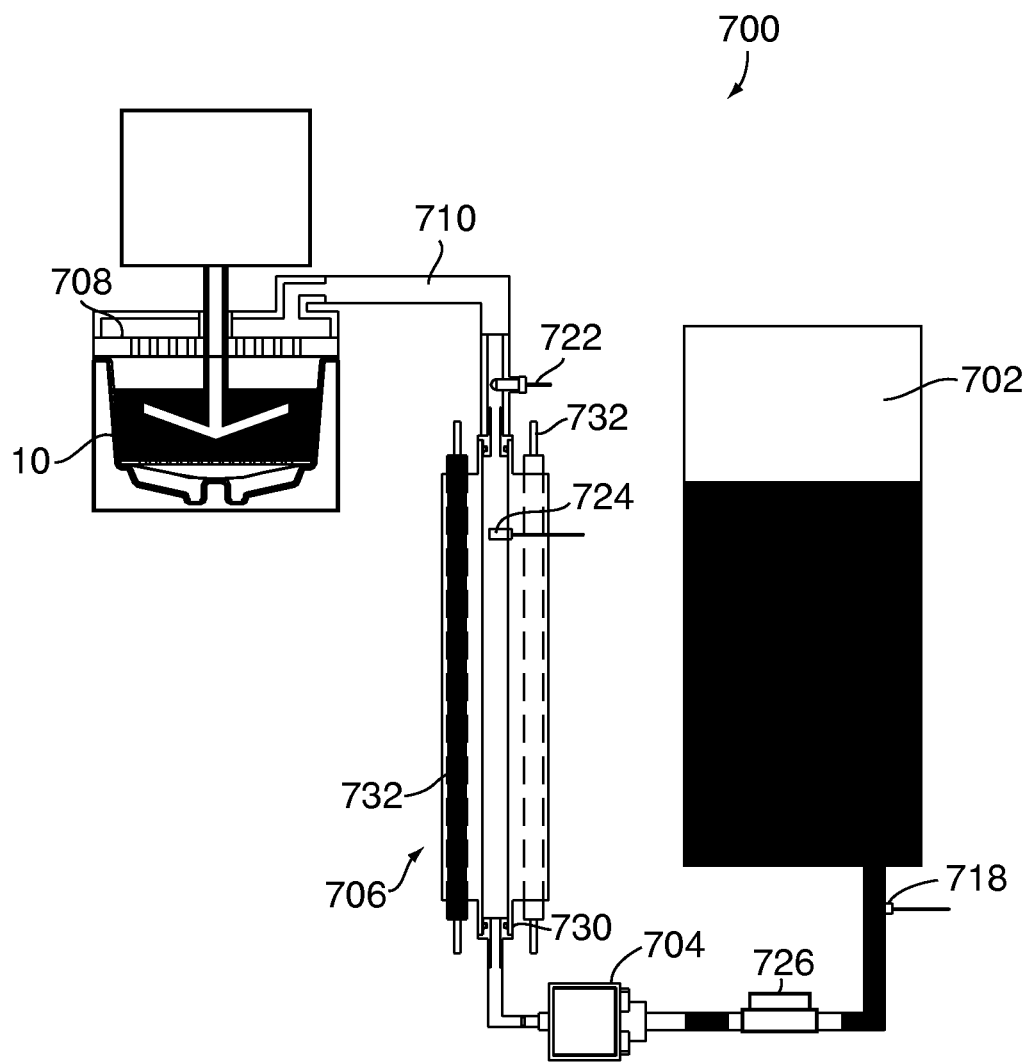
FIG. 80 is a schematic view of the beverage appliance of FIG. 75 illustrating a pre-heating step.
Figure 81:
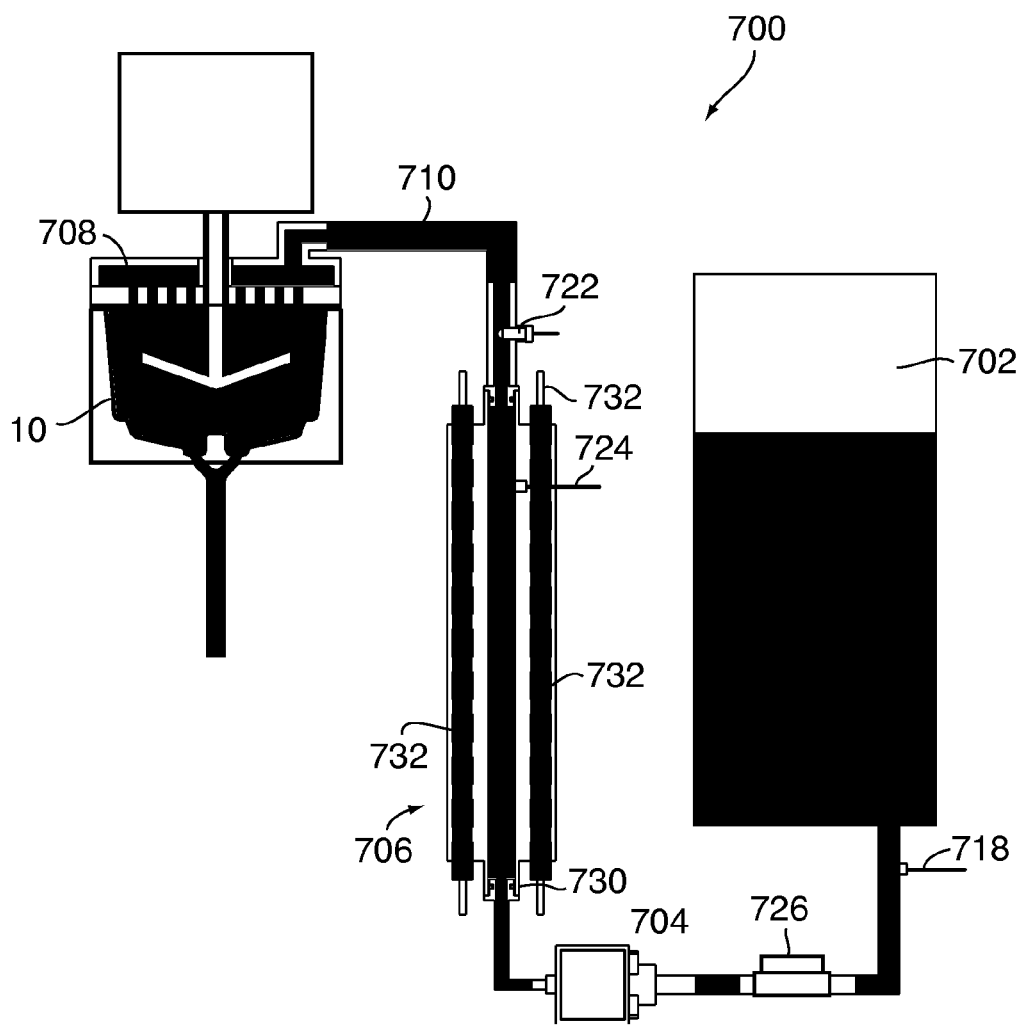
FIG. 81 is a schematic view of the beverage appliance of FIG. 75 illustrating a brewing step.
Figure 82:
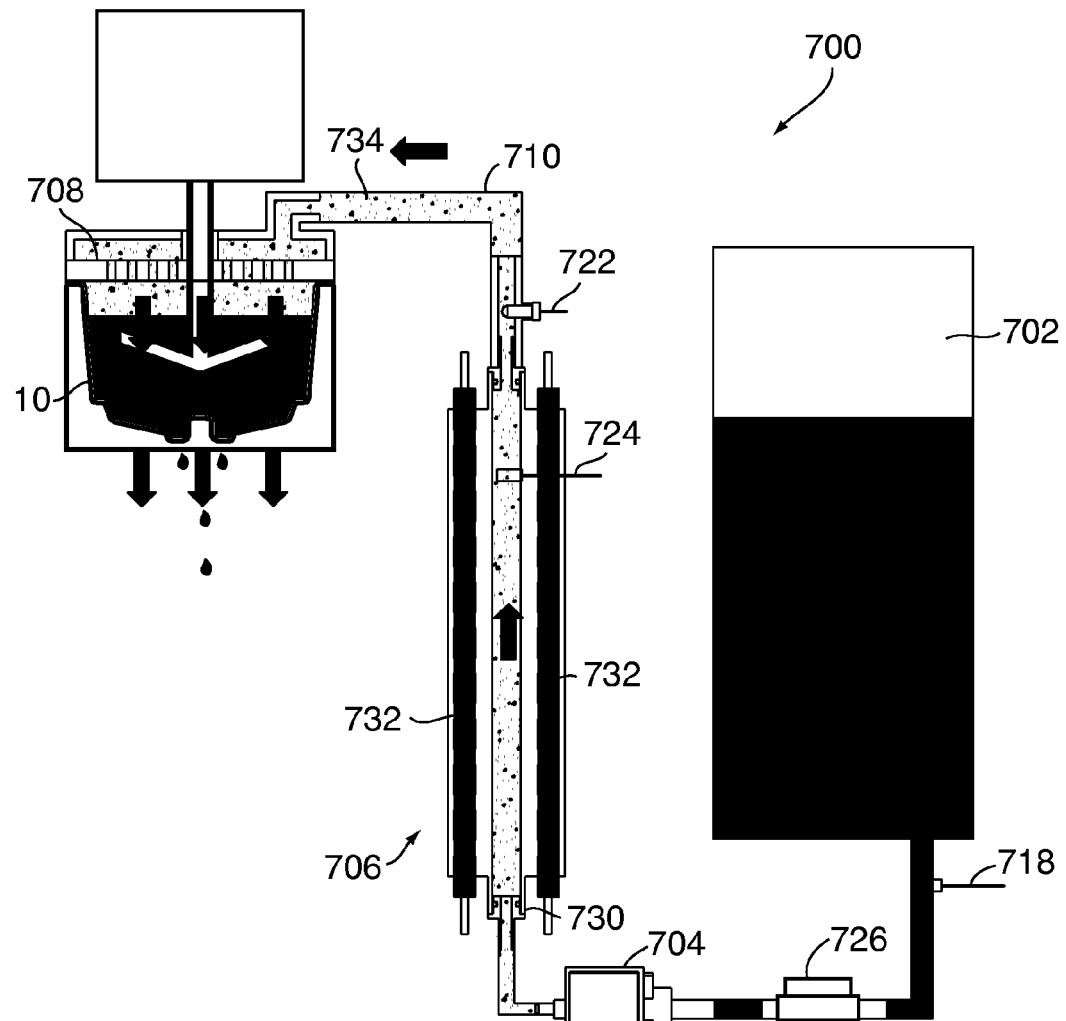
FIG. 82 is a schematic view of the beverage appliance of FIG. 75 illustrating a post-brewing, purging step.

FIGS. 80-82 illustrate the water heating process utilized during the brewing cycle. As shown in FIG. 80, a first step in the water heating process is pre-heating. When a user switches on the main power to the appliance 700, the heater in the boiler 706 will switch on as well. The heater sensor 724 monitors the temperature of the boiler 706 and, in conjunction with the controller, provides temperature regulation (i.e., shuts off the heater and/or decreases power thereto) when the desired temperature has been reached. As illustrated in FIG. 80, during pre-heating, only one of the heaters 732 is activated to achieve the desired boiler pre-heat temperature while avoiding substantial temperature overshoot. In other embodiments, lower power (e.g., electronically reduced power) may be utilized in the pre-heat step to achieve the desired pre-heat temperature. In an embodiment, pre-heating may be an optional step dependant upon the effectiveness of the boiler 706 at heating the water passing therethrough. As will be readily appreciated, pre-heating ensures that the first shot of water into the filter cup 10 has reached the desired brewing temperature. Pre-heating may be necessary in instances where the appliance 700 has not been used in some time such that the boiler 706 has completely cooled.

Turning now to FIG. 81, a brewing step is illustrated. As shown therein, water is pumped from the reservoir 702 to the filter cup 10. Importantly, when the pump 704 is activated by the controller, both heaters 732 in the boiler 706 automatically turn on and heat up. During operation, water passing through the water channel 730 of the boiler 706 will thus heat up instantly. The water inlet and outlet sensors 718, 722 monitor the water temperature just before entering the boiler 706 and just after exiting the boiler 706 and relay the detected temperatures to the controller for analysis and system control. For example, when the water temperature exiting the boiler 706 is lower than desired, as detected by outlet sensor 722, the controller prompts the pump 704 to decrease flow rate to give the water more time to heat up and reach the desired temperature as it passes through the boiler 706. As noted above, the flow rate is monitored by the flow meter 726. Importantly, the controller and PCB 720 continuously monitor the water flow rate and water temperatures at various points along its path and adjust the flow rate and/or heater power to maintain an optimal water brewing temperature throughout the entire brewing cycle. In view of the above, the system of the present invention matches the flow rate of the water with a power level delivered by the heaters 732 in order to heat water to a desired temperature throughout the entire brewing cycle.

FIG. 82 illustrates a post-brewing, purging step in which any remaining water in the lines is blown out. As shown therein, near or at the end of the brewing step, the pump will stop prior to the heaters 732 being switched off. This results in the excess water remaining in the boiler being converted to steam. The steam 734 then travels through the supply conduit 710 and forces out the hot water in the brewing cavity (conduit 710, shower head 708, etc.) and filter cup 10. As will be readily appreciated, this ensures that substantially all of the coffee in the cup 10 exits without substantial dripping. In addition, this also ensures that the cup 10 is dry and does not drip when it is removed for disposal.

Referring now to FIGS. 83-88, an alternative filter cup 800 for use with an appliance according to the present invention includes a cup body 802, a filter 804, a protective screen 806 and a cover 808. The filter 804 is preferably a paper filter or a filter formed from other material used in known coffee makers and is positioned adjacent the bottom of the cup body 802. The filter 804 prevents coffee grounds and/or other sediment from exiting the cup 800 during brewing but permits the passage of liquid. The protective screen 806 is preferably formed from plastic or other abrasion resistant material and is positioned on top of the filter 804 inside the cup 800. Importantly, the screen 806 protects the paper filter 14 from abrasion caused by the grinding blade and/or coffee grounds. As shown therein, both the paper filter 804 and the screen 806 are circular and sized to be closely received by the circumferential sidewall of the cup at the bottom thereof.

Figure 83:
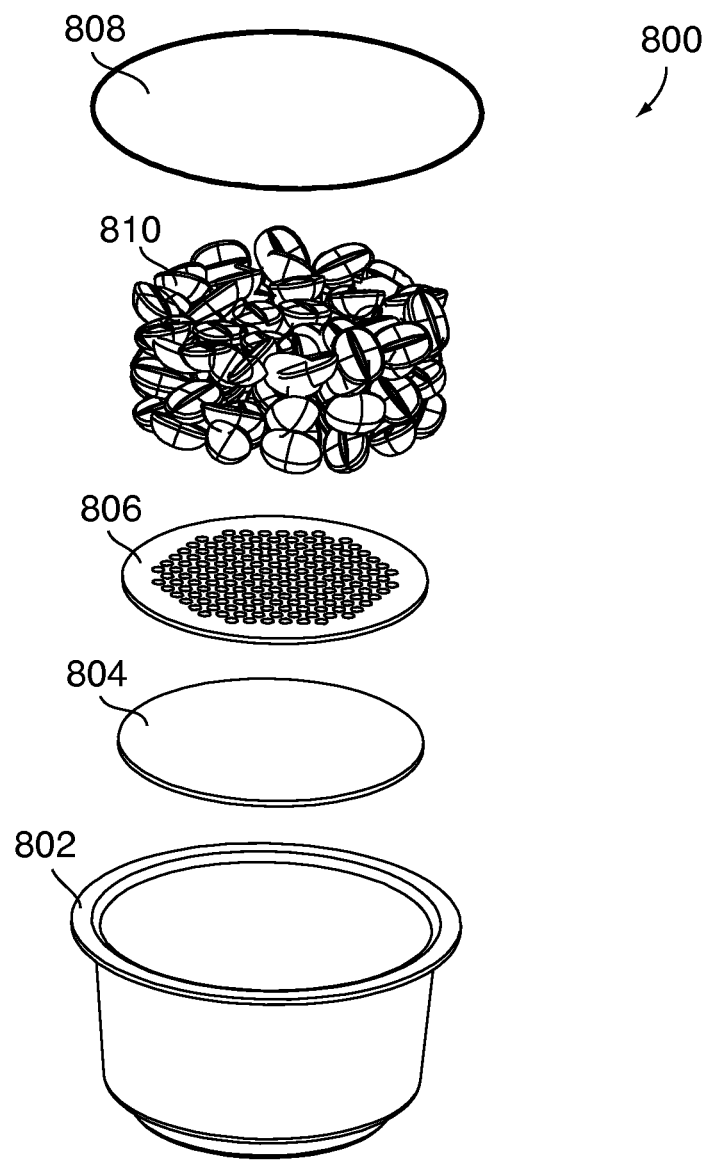
FIG. 83 is an exploded view of a whole coffee bean air-tight filter cup according to the present invention.
Figure 84:
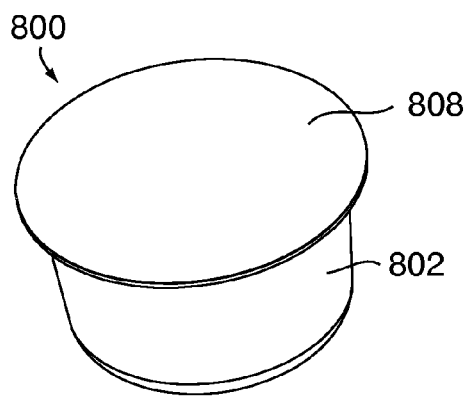
FIG. 84 is a perspective top view of the whole coffee bean air-tight filter cup of FIG. 83.
Figure 85:
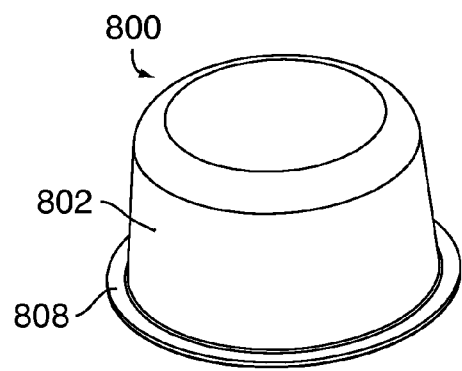
FIG. 85 is a perspective bottom view of the whole coffee bean air-tight filter cup of FIG. 83.
Figure 86:
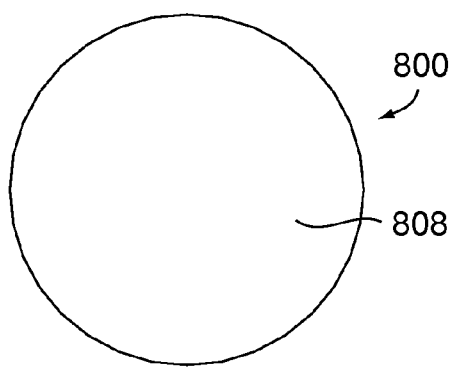
FIG. 86 is a top plan view of the whole coffee bean air-tight filter cup of FIG. 83.
Figure 87:
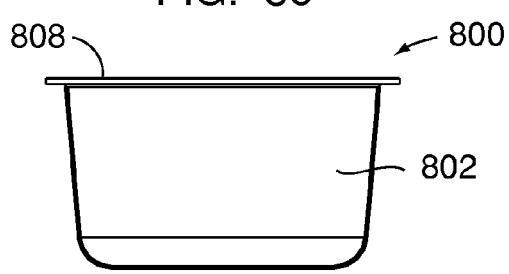
FIG. 87 is a side elevational view of the whole coffee bean air-tight filter cup of FIG. 83.
Figure 88:
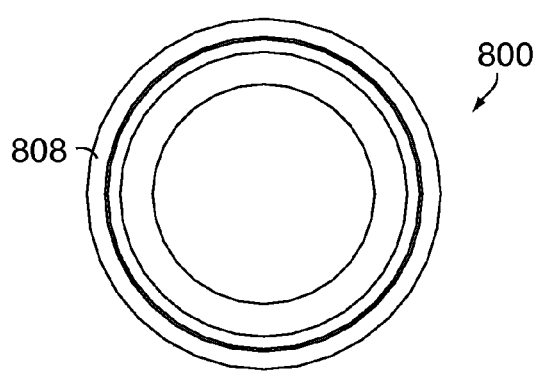
FIG. 88 is a bottom plan view of the whole coffee bean air-tight filter cup of FIG. 83.
Figure 92:
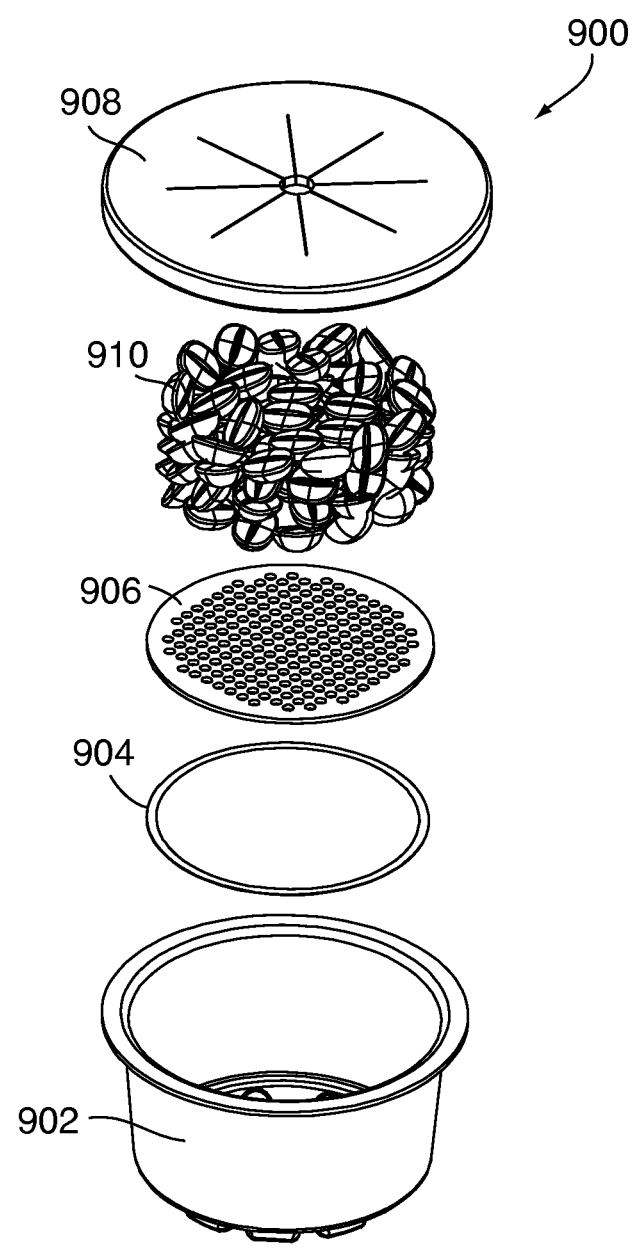
FIG. 92 is an exploded view of a reusable whole coffee bean filter cup according to the present invention.
Figure 93:
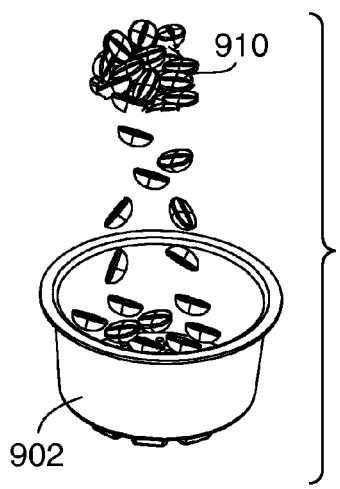
FIG. 93 is a perspective view of the reusable whole coffee bean filter cup of FIG. 92 illustrating how whole coffee beans are inserted.
Figure 94:
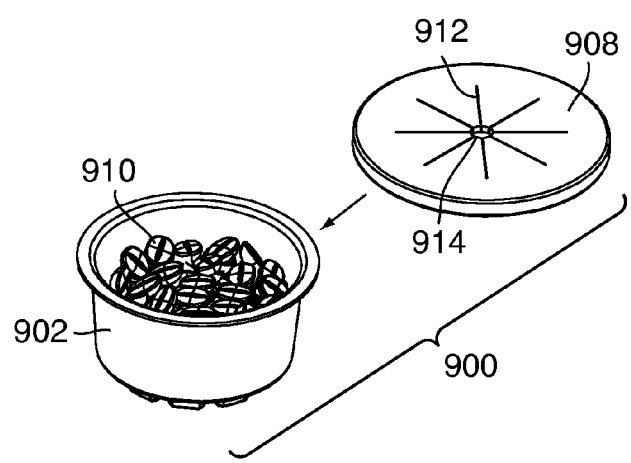
FIG. 94 is a perspective view of the reusable whole coffee bean filter cup of FIG. 92 illustrating how the cover is placed on the cup.
Figure 95:
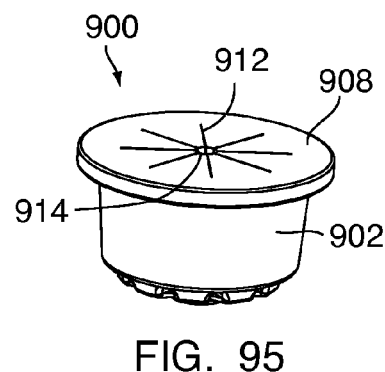
FIG. 95 is a perspective view of the reusable whole coffee bean filter cup of FIG. 92 illustrating a ready-to-use state.

The cover 808 is preferably foil, although it may be formed from aluminum or other material known in the art, and it is preferably heat-sealed or otherwise releasably affixed to the top rim of the cup 10. A plurality of whole coffee beans 810 are enclosed in the space between the cover 808 and the protective screen 806. While FIG. 83 shows coffee beans housed in the filter cup 800, other types of food and substances, such as tea and the like, may be used in similar fashion to that described herein, without departing from the broader aspects of the present invention. Notably, the cup 800 is completely sealed such that it provides a fully air-tight container for the coffee beans 810. As will be readily appreciated, this helps to maintain freshness of the coffee beans 810 prior to use.

A coffee appliance 850 for use with the air-tights filter cup 800 is shown in FIG. 89. The coffee appliance 850 is substantially similar to, and operates in substantially the same manner as, the coffee appliance 100 disclosed above. As shown therein, the coffee appliance 850 includes a housing 852, a base 854, and filter cup tray 856 slidably received in the housing 852 and dimensioned to closely receive a filter cup 800. A grinding motor 858 is positioned in the housing 852 about the filter cup tray 856 and includes a blade assembly 860 for grinding the coffee beans, in the manner disclosed hereinbefore. In particular, the tray 856 may be moved towards the blade assembly 860 such that the cover 808 of the filter cup is pierced by the blade 860 and the blade 860 enters the cup 800. Alternatively, the motor 858 and blade 860 may be moved towards the cup 800 such that the cover 808 is pierced by the blade 860 and the blade 860 enters the cup 800. In any event, once the blade 860 is positioned within the cup 800, the motor 858 is actuated, causing the blade 860 to rotate at a predetermined frequency, thereby grinding the whole coffee beans 810 or otherwise mixing the drink ingredients within the cup 800.

As further shown therein, the coffee appliance 850 includes a water reservoir 862, a pump 864 and a heater/boiler 866. After the coffee beans 810 are ground within the cup 800, water is pumped from the water reservoir 862 through the heater 866, which heats the water to a predetermined temperature. The water then continues from the heater 866, through a supply conduit 868 and to a shower head 870 positioned above the filter cup 899 and tray 856 from which it is passed through the filter cup 800 to produce brewed coffee.

Importantly, as best shown in FIGS. 90 and 91, the filter cup tray 856 includes a hollow needle 872 extending upwardly from the floor thereof. This needle/tube is necessary to pierce a hole in the bottom of the air-tight filter cup 800 when it is inserted in the filter cup tray 856 and serves as an exit for the coffee after brewing. In operation, a user selects a filter cup 800 containing his/her coffee beans of choice and presses the cup 800 into the recess in the filter cup tray 850 such that the hollow needle pierces the bottom of the filter cup 800. The tray 850 may then be inserted into the coffee appliance housing 852 to continue with the brewing process, as described above.

Referring now to FIGS. 92-96, a reusable filter cup 900 for use with the coffee and beverage appliances disclosed above is shown. The reusable filter cup 900 includes a cup body 902, a filter 904, a protective screen 906 and a cover 908. The filter 904 is preferably a permanent filter that is constructed of a material that is durable and capable of repeated use. As with the filter cups disclosed above, the filter 904 prevents coffee grounds and/or other sediment from exiting the cup 900 during brewing but permits the passage of liquid. The protective screen 906 is preferably formed from plastic or other abrasion resistant material and is positioned on top of the filter 904 inside the cup 900. Importantly, the screen 806 protects the paper filter 14 from abrasion caused by the grinding blade and/or coffee grounds. The protective screen 906 may be removable.

The cover 908 is dimensioned to be closely and tightly received on the cup body 902 and is preferably formed from rubber or other durable, deformable and malleable material. The cover 908 is removable to permit a user to fill the cup 900 with coffee beans 910. Importantly, the cover 908 includes a plurality of slits 912 extending from a central aperture 914. The slits 912 allow for the insertion of the grinding blade through the cover 908 without destroying the cover 908 such that the container, including the cover, may be reused. In addition, this cover configuration helps to retain the coffee grounds in the cup 900 during grinding. Moreover, such a cup construction also facilitates cleaning of the cup 900. The floor of the cup 900 is substantially the same as that of the filter cup 100 and includes a plurality of apertures.

Figure 96:
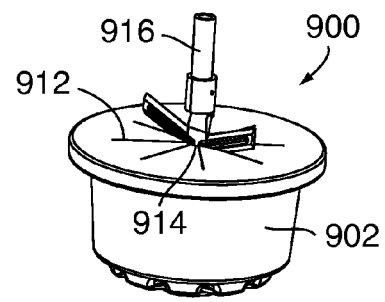
FIG. 96 is a perspective view of the reusable whole coffee bean filter cup of FIG. 92 illustrating how a grinding blade is inserted.

FIGS. 93-96 illustrate the use of the reusable filter cup 900. As shown therein, with the cover 908 removed, selected coffee beans 910 are inserted into the cup 900. As shown in 94 and 95, the cover 908 is placed on the cup body 902 to enclose the coffee beans 910 therein. The cup 900 may then be inserted into an appliance, such as appliance 100, in the manner hereinbefore described and the brewing process commenced. As shown in FIG. 96, a grinding blade 916 may then be inserted through the slits 912 such that the shaft of the grinding blade is received in the aperture 914 in the cover 908.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A beverage appliance, comprising:
a base adapted to receive a brewed beverage receptacle;
a housing, said housing including a liquid reservoir;
a brewing tray in mechanical communication with said housing and dimensioned to receive a container containing at least one drink ingredient having particles of a first size, said container including a seal for preventing said particles from spilling out of said container;
a grinding mechanism for selectively reducing said particles from said first size to a second size within said container, said second size being smaller than said first size;
a water delivery mechanism adapted to deliver liquid from said liquid reservoir to said container to mix with said at least one drink ingredient of said second size to make a brewed beverage; and
wherein said grinding mechanism is selectively moveable between a first grinding position outside of said container, to a second grinding position inside of said container, said grinding mechanism piercing said seal when moving from said first position to said second position.

2. The beverage appliance of claim 1, wherein:
said brewing tray is slidably received by said housing and is movable between a first position in which said brewing tray is extended from said housing to allow for insertion of said container, and a second position in which said brewing tray is positioned within said housing.

3. The beverage appliance of claim 1, further comprising:
a control panel for controlling a volume of water delivered to said container.

4. The beverage appliance of claim 1, wherein:
said water delivery mechanism includes a pump for selectively pumping liquid from said liquid reservoir to said container.

5. The beverage appliance of claim 1, wherein:
said at least one drink ingredient is a plurality of whole coffee beans.

6. The beverage appliance of claim 5, wherein:
said mechanism is a grinding blade rotatably driven by a motor.

7. A beverage appliance, comprising:
a base;
a housing, said housing including a liquid reservoir;
a receptacle in mechanical communication with said housing and dimensioned to receive a container containing at least one drink ingredient having particles of a first size; and
a grinding mechanism for selectively reducing said particles from said first size to a second size within said container, said second size being smaller than said first size; and a liquid delivery system configured to selectively deliver liquid from said liquid reservoir to one of a brewing outlet adjacent said receptacle and a hot-water outlet;

wherein at least one of said grinding mechanism and said receptacle is movable towards the other of said grinding mechanism and said receptacle from a first position where said grinding mechanism is disposed outside said container to a second position where said grinding mechanism is disposed within said container.

8. The beverage appliance of claim 7, further comprising:
a valve, said valve being selectively controllable between a first state in which said liquid is delivered to said brewing outlet, and a second state in which said liquid is delivered to said hot-water outlet.

9. The beverage appliance of claim 8, wherein:
said valve is positioned along a hot-water distribution line of said liquid delivery system upstream from said receptacle.

10. The beverage appliance of claim 8, further comprising:
a brewing supply conduit in fluid communication with said brewing outlet and said valve; and
a hot-water tube in fluid communication with said hot-water outlet and said valve.

11. The beverage appliance of claim 8, further comprising:
a control panel for controlling said valve between said first state and said second state.

12. The beverage appliance of claim 7, wherein:
said particles of at least one drink ingredient are whole coffee beans.

13. The beverage appliance of claim 12, wherein:
said mechanism is a grinding blade rotatably driven by a motor.

14. A coffee appliance, comprising:
a base adapted to receive a brewed beverage receptacle;
a reservoir;
a housing;
a receptacle in mechanical communication with said housing and dimensioned to receive a container containing at least one drink ingredient having particles of a first size;
a grinding mechanism for selectively reducing said particles from said first size to a second size within said container, said second size being smaller than said first size; and
a water delivery mechanism to deliver water from said reservoir to said container to mix with said at least one drink ingredient to make a brewed beverage;
wherein said receptacle includes a hollow needle configured to form a hole in a bottom floor of said container upon insertion of said container in said receptacle, said hollow needle also providing an outlet for the flow of said brewed beverage from said container to said brewed beverage receptacle.

15. The coffee appliance of claim 14, wherein:
said receptacle is slidably received by said housing and is movable between a first position in which said receptacle is extended from said housing to allow for insertion of said container, and a second position in which said receptacle is positioned within said housing.

* * * * *